US012583764B2

(12) United States Patent
Raczko et al.

(10) Patent No.: US 12,583,764 B2
(45) Date of Patent: Mar. 24, 2026

(54) PFAS TREATMENT PROCESS FOR LIQUID EFFLUENT

(71) Applicant: SUEZ INTERNATIONAL, Paris la Defense (FR)

(72) Inventors: Robert Raczko, Pompton Plains, NJ (US); Isabelle Baudin, Nanterre (FR); Naike Noyon, Elancourt (FR); Zdravka Doquang, Bailly (FR)

(73) Assignee: SUEZ INTERNATIONAL, Paris la Defense (FR)

( * ) Notice: Subject to any disclaimer, the term of this patent is extended or adjusted under 35 U.S.C. 154(b) by 458 days.

(21) Appl. No.: 18/005,923

(22) PCT Filed: Jul. 19, 2021

(86) PCT No.: PCT/IB2021/056503
§ 371 (c)(1),
(2) Date: Jan. 18, 2023

(87) PCT Pub. No.: WO2022/018613
PCT Pub. Date: Jan. 27, 2022

(65) Prior Publication Data
US 2023/0348295 A1 Nov. 2, 2023

(30) Foreign Application Priority Data
Jul. 21, 2020 (WO) ................. PCT/IB2020/000618

(51) Int. Cl.
*B01J 20/24* (2006.01)
*C02F 1/00* (2023.01)
(Continued)

(52) U.S. Cl.
CPC .............. *C02F 1/008* (2013.01); *B01J 20/24* (2013.01); *C02F 1/285* (2013.01);
(Continued)

(58) Field of Classification Search
CPC ...... C02F 1/008; C02F 1/285; C02F 2101/36; C02F 2209/005; C02F 1/583; C02F 1/28;
(Continued)

(56) References Cited

U.S. PATENT DOCUMENTS 5,268,300 A * 12/1993 Latura ..................... C02F 1/008
436/39
2010/0307973 A1* 12/2010 Grcevic ............... B01D 61/025
210/639
(Continued)

FOREIGN PATENT DOCUMENTS

WO 2008/044945 A2 4/2008
WO 2011/139984 A2 11/2011
(Continued)

OTHER PUBLICATIONS

EPA Publication: Reducing PFAS in Drinking Water with Treatment Technologies, published Aug. 23, 2018. (Year: 2018).*
(Continued)

*Primary Examiner* — Joseph W Drodge
(74) *Attorney, Agent, or Firm* — Sughrue Mion, PLLC

(57) ABSTRACT

A method for controlling for PFAS removal from a liquid effluent by a control system (100), the control system including a PFAS treatment unit (10) dedicated to the treatment of perfluoroalkyls and polyfluoroalkyl substances PFAS including at least one treatment stage optionally chosen from a PFAS treatment stage, a short chain PFAS treatment stage and a long chain PFAS treatment stage. The method allows activating the PFAS treatment unit only when PFAS, in particular specific PFAS, are detected into the liquid effluent to treat. A control system (100) to implement the method is also disclosed.

16 Claims, 3 Drawing Sheets

(51) Int. Cl.
C02F 1/28 (2023.01)
C08B 37/16 (2006.01)
C08L 5/02 (2006.01)
*C02F 101/36* (2006.01)
(52) U.S. Cl.
CPC ............ C08B 37/0012 (2013.01); C08L 5/02
(2013.01); *C02F 2101/36* (2013.01); *C02F*
*2209/005* (2013.01); *C08L 2312/00* (2013.01)
(58) Field of Classification Search
CPC .. C02F 1/42; C02F 1/441; C02F 1/442; C02F
1/281; C02F 1/283; C02F 1/422; C02F
1/44; C02F 2101/363; C02F 2209/001;
C02F 2209/006; B01J 20/24; B01J 20/12;
B01J 20/20; B01J 21/16; B01J 41/00;
B01J 47/14; C08B 37/0012; C08L 5/02;
C08L 2312/00; B01D 61/02; B01D
61/025; B01D 61/026; B01D 61/027;
B01D 61/029; B01D 61/04; B01D 61/10;
B01D 61/12; B01D 2311/2623; B01D
2311/2626
See application file for complete search history.

(56) References Cited

U.S. PATENT DOCUMENTS

| | | | | | |
|---|---|---|---|---|---|
| 2011/0257788 | A1* | 10/2011 | Wiemers | ................. | C02F 1/463 |
| | | | | | 700/271 |
| 2011/0315615 | A1* | 12/2011 | Lin | ........................... | C02F 9/20 |
| | | | | | 210/142 |

| | | | | | |
|---|---|---|---|---|---|
| 2014/0048490 | A1* | 2/2014 | Roelen | .................... | C02F 1/442 |
| | | | | | 210/708 |
| 2015/0001161 | A1* | 1/2015 | Wiemers | ............ | E21B 43/2607 |
| | | | | | 210/201 |
| 2016/0304630 | A1 | 10/2016 | Dichtel et al. | | |
| 2017/0313608 | A1 | 11/2017 | Peterson et al. | | |
| 2018/0282530 | A1* | 10/2018 | O'Shea | ..................... | B09C 1/08 |
| 2019/0241452 | A1* | 8/2019 | Ball | ........................... | C02F 1/70 |
| 2019/0270041 | A1 | 9/2019 | Lin et al. | | |
| 2019/0300387 | A1* | 10/2019 | Nelson | ..................... | B03D 1/24 |
| 2020/0155885 | A1* | 5/2020 | Strathmann | .............. | A62D 3/36 |
| 2020/0206793 | A1* | 7/2020 | Brady | ..................... | C02F 1/041 |
| 2020/0338378 | A1* | 10/2020 | Yost | ......................... | A62D 3/36 |
| 2020/0368717 | A1* | 11/2020 | Donovan | ............... | C02F 1/281 |
| 2020/0369536 | A1* | 11/2020 | Motkuri | .................. | A62D 3/40 |
| 2021/0206670 | A1* | 7/2021 | Zhao | ........................ | B01J 21/18 |
| 2023/0226518 | A1* | 7/2023 | Donovan | ................. | B09C 1/08 |
| | | | | | 502/401 |

FOREIGN PATENT DOCUMENTS

| | | | | | |
|---|---|---|---|---|---|
| WO | WO-2018027273 | A1 * | 2/2018 | .............. | C02F 1/28 |
| WO | 2018/200857 | A1 | 11/2018 | | |
| WO | 2019/004298 | A1 | 1/2019 | | |

OTHER PUBLICATIONS

International Search Report for PCT/IB2021/056503 dated Sep. 17, 2021 (PCT/ISA/210).
Written Opinion for PCT/IB2021/056503 dated Sep. 17, 2021 (PCT/ISA/237).

* cited by examiner

Fig.2

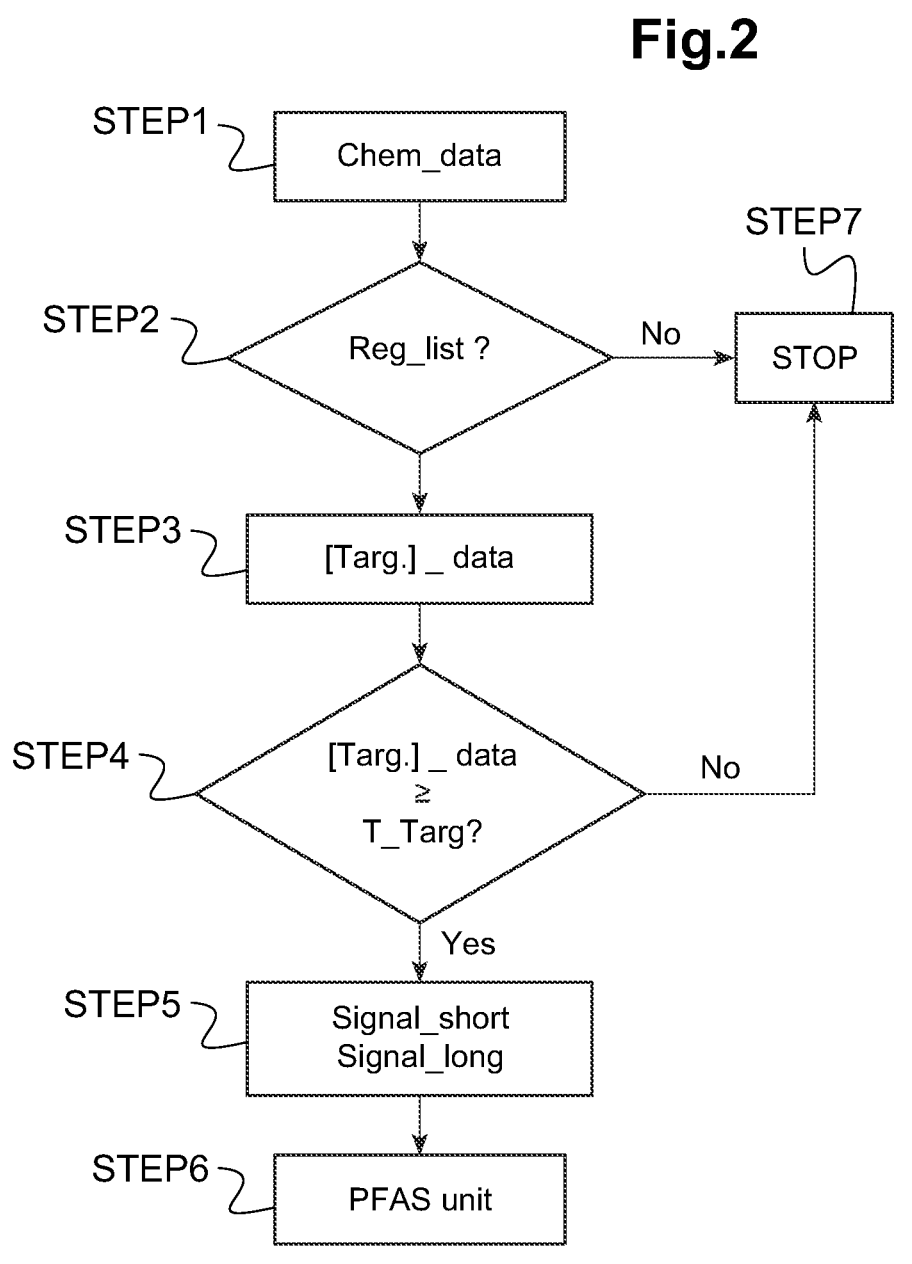

STEP1 — Chem_data

STEP2 — Reg_list ? —No→ STEP7 — STOP

STEP3 — [Targ.] _ data

STEP4 — [Targ.] _ data $\geqq$ T_Targ? —No→

Yes

STEP5 — Signal_short Signal_long

STEP6 — PFAS unit

PFAS TREATMENT PROCESS FOR LIQUID EFFLUENT

CROSS REFERENCE TO RELATED APPLICATIONS

This application is a National Stage of International Application No. PCT/IB2021/056503 filed Jul. 19, 2021, claiming priority based on International Application No. PCT/IB2020/000618 filed Jul. 21, 2020.

BACKGROUND

Perfluoroalkyls and polyfluoroalkyl substances (PFAS) are a family of more than 4700 man-made emerging compounds with a completely or partially fluorinated hydrophobic alkyl chain, the most known families of which are perfluorinated carboxylic acids (PFCAs) and perfluorinated sulfonic acids (PFSAs).

PFAS have been used in numerous industrial applications, such as firefighting foams, coating, textile stain guards, etc., since 1940s because of their surfactant properties. PFAS can be released into the environment via numerous pathways including air, soil, and water and they have been detected in water sources, soil and biological samples.

PFAS have become an issue as emerging organic contaminants for they can be widely found in both wastewater effluent and drinking water worldwide, and also for their stability in the environment, potential for bioaccumulation and their negative health outcomes.

Due to the growing concerns on the ecological and human health effects of PFAS, many countries established regulations and guide values in drinking water, sources and soil for these compounds for long chains PFAS.

In the same time, industrials tried finding some new alternatives to replace these long-chain compounds introducing short-chain PFAS, a group of chemicals that are more water soluble and hydrophilic but with low bioaccumulation potential and less acute toxicity. However, these compounds are small and often more persistent resulting in long term risk concern.

As a consequence, water resources are being contaminated by a large variety of PFAS compounds having different carbon-chain (C-Chain) length and also different functionalities, properties, treatability.

Existing removal treatments for treating resources for drinking water production, use adsorbent materials, ion exchange resins, reverse osmosis or nanofiltration. Other treatments such as oxidation and especially advanced oxidation processes can be used for resources and soil remediation.

The most effective treatment technologies for PFAS having different carbon-chain length appear to be nanofiltration (NF) and reverse osmosis (RO), however these treatments are costly for design and operation.

Various sorbents have been reported to be effective in the removal of PFAS. These sorbents include granular activated carbon (GAC), powdered activated carbon (PAC), superfine powdered activated carbon (SPAC), anion-exchange resin, biomaterials, molecularly imprinted polymers (MIP) and mineral materials. Some adsorbents such as modified clays and cyclodextrin polymers have also shown their efficiency for some PFAS. Particularly, these adsorption technologies have been found to offer better economic performance compared to other removal techniques such as NF or RO. However, since PFASs molecules have hydrophilic groups and hydrophobic and oleophobic carbon-fluorine chains, their sorption behavior and mechanisms are complicated. The emerging PFAS compounds having short chain length and being polar and hydrophilic, are the most difficult to be removed by conventional treatment well adapted for long chains PFAS (adsorption on activated carbon, exchange on resin . . . ). Only NF or RO membranes processes can remove all PFAS compounds up to smaller chain-length.

There is therefore a need for a treatment able to remove PFAS whatever the length of their carbon chain, and their hydrophobicity, in particular at low cost.

SUMMARY

The present invention relates to a method for controlling removal of perfluoroalkyls and polyfluoroalkyl substances PFAS from a liquid effluent by means of a control system including a PFAS treatment unit dedicated to the treatment of PFAS including at least one treatment stage optionally chosen from a short and long chain PFAS dedicated treatment stage, a short chain PFAS dedicated treatment stage and a long chain PFAS dedicated treatment stage.

Definitions

The terminology used herein is for the purpose of describing particular embodiments only and is not intended to be limiting of the presently disclosed subject matter. While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. In describing the presently disclosed subject matter, it will be understood that a number of techniques and steps are disclosed. Each of these has individual benefit and each can also be used in conjunction with one or more, or in some cases all, of the other disclosed techniques.

Perfluoroalkyl substances are fully fluorinated (perfluoro-) alkane (carbon-chain) molecules. Their basic chemical structure is a chain (or tail) of two or more carbon atoms with a charged functional group head attached at one end. The common functional groups are carboxylates or sulfonates, but other forms are also detected in the environment. Fluorine atoms are attached to all possible bonding sites along the carbon chain of the tail, except for one bonding site on the last carbon where the functional group head is attached. This structure can be written as $C_nF_{2n+1}$—R, where "$C_nF_{2n+1}$" defines the length of the perfluoroalkyl chain tail, "n" is >2, and "R" represents the attached functional group head. Note that the functional group may contain 1 or more carbon atoms, which are included in the total number of carbons when naming the compound.

Perfluoroalkyl acids (PFAAs) are some of the most basic PFAS molecules. They are essentially non-degradable and currently are the class of PFAS most commonly tested for in the environment. The PFAA class is divided into two major groups:

Perfluoroalkyl carboxylic acids (PFCAs, $C_nF_{2n+1}$—R, with R=—COOH), or perfluoroalkyl carboxylates (PFCAs, $C_nF_{2n+1}$—R, with R=—COO⁻) are terminal degradation products of select precursor polyfluoroalkyl substances, such as fluorotelomer alcohols (FTOHs). The most frequently detected PFCA is Perfluorooctanoic acid, $C_7F_{15}COOH$ (PFOA).

Perfluoroalkane sulfonic acids (PFSAs, $C_nF_{2n+1}$—R, with R=—$SO_3H$), or perfluoroalkyl sulfonates (PFSAs, $C_nF_{2n+1}$—R, with R=—$SO_3^-$), are also terminal degradation products of select precursor polyfluoroalkyl substances, such as perfluoroalkyl sulfonamidoethanols (FASEs). The most frequently detected PFSA is Perfluorooctane sulfonate, $C_8F_{17}SO_3^-$ (PFOS).

Perfluoroalkane sulfonamides (FASAs, $C_nF_{2n+1}$—R, with R=—$SO_2NH_2$), such as perfluorooctane sulfonamide (FOSA, $C_8F_{17}SO_2NH_2$), are used as raw material to make perfluoroalkyl sulfonamide substances that are used for surfactants and surface treatments. FASAs can degrade to form PFAAs such as PFOS.

Polyfluoroalkyl substances are distinguished from perfluoroalkyl substances by not being fully fluorinated. Instead, they have a non-fluorine atom (typically hydrogen or oxygen) attached to at least one, but not all, carbon atoms, while at least two or more of the remaining carbon atoms in the carbon chain tail are fully fluorinated. The carbon-hydrogen (or other non-fluorinated) bond in polyfluoroalkyl molecules creates a "weak" point in the carbon chain that is susceptible to biotic or abiotic degradation.

As a result, many polyfluoroalkyl substances that contain a perfluoroalkyl $C_nF_{2n+1}$ group are potential precursor compounds that have the potential to be transformed into PFAAs.

Long-chain refers commonly to:

perfluoroalkyl carboxylic acids, PFCAs, with eight or more carbons (seven or more carbons are perfluorinated), perfluoroalkane sulfonates, PFSAs, with six or more carbons (six or more carbons are perfluorinated), and for all the other perfluoroalkyls and polyfluoroalkyl substances to PFAS having a carbon chain with six or more carbon atoms.

Short-chain refers commonly to:

perfluoroalkyl carboxylic acids with seven or fewer carbons (six or fewer carbons are perfluorinated), perfluoroalkane sulfonates with five or fewer carbons (five or fewer carbons are perfluorinated), and for all the other perfluoroalkyls and polyfluoroalkyl substances to PFAS having a carbon chain with five or less carbon atoms.

Liquid effluent in the meaning of said invention includes raw water, urban effluents, industrial effluents.

Raw water in the meaning of said invention includes any water intended for drinking water production, such as ground water or resources water, as well as surface water.

Urban effluents include wastewater, leachates, effluents from waste truck wash. Urban wastewater includes domestic wastewater coming from households, municipal wastewater issued from public facilities, commercial and institutional facilities, and eventually industrial wastewater (by-product of industrial or commercial activities).

Industrial effluents include liquid waste or sewage discharged by industrial activities, including leachates. Leachates are the result of water percolating through domestic, agricultural or industrial waste stored in a landfill.

In the meaning of said invention, a short chain PFAS dedicated treatment stage is a treatment stage able to treat, i.e. to remove, short chain PFAS. A long chain PFAS dedicated treatment stage is a treatment stage able to treat, i.e. to remove, long chain PFAS. Similarly, a short and long chain PFAS dedicated treatment stage is a treatment stage able to treat, i.e. to remove, both short and long chain PFAS either by combination of a short chain PFAS dedicated treatment stage and a long chain PFAS dedicated treatment stage, for example by mixture of reagents, each reagent being dedicated to remove short or long chain PFAs, or by an appropriate treatment able to treat both short and long chain PFAS.

In particular, a short and/or long chain PFAS dedicated treatment stage can be defined as a treatment stage having a short and/or long chain PFAS removal efficiency sufficient to attain a pre-defined final concentration of short and/or long chain PFAS at its outlet in an effluent having a given initial concentration in short and/or long chain PFAS. This pre-defined final concentration is for example imposed by regulation or a user.

This removal efficiency is typically of at least 70%, preferably of at least 80%, most preferably of at least 90% but could be different depending on the initial concentration of PFAS and the targeted final concentration.

"Removal efficiency" or "efficiency of the removal" or "m % removal" is defined by the formula (1):

$$Removal\ efficiency\ (\%)=[1-(y/x)]\cdot 100 \qquad (1)$$

Where x is the mass content of PFAS before treatment and y is the mass content of PFAS after treatment. This mass content of PFAS may be measured by liquid chromatography coupled with mass spectroscopy (standard methods EPA 533 and 537.1 and standard ISO 21675:2019)

DETAILED DESCRIPTION

According to a first aspect, a method for controlling PFAS removal from a liquid effluent by means of a control system is provided, said control system including a PFAS treatment unit dedicated to the removal of perfluoroalkyls and polyfluoroalkyl substances PFAS. The PFAS treatment unit includes at least one treatment stage optionally chosen from a short and long chain PFAS dedicated treatment stage, a short chain PFAS dedicated treatment stage and a long chain PFAS dedicated treatment stage.

The method comprises:

(A) providing information data representative of the presence or absence of PFAS in a liquid effluent to treat, (B) generating at least one activating signal for activating the PFAS treatment unit when the provided information data indicate the presence of PFAS chosen from short chain PFAS, long chain PFAS and short and long chain PFAS, said at least one activating signal being optionally chosen from:

a signal for activating said at least one short and long chain PFAS treatment stage when the provided information data include information data representative of the presence of at least one PFAS chosen from short chain PFAS, long chain PFAS and short and long chain PFAS, a signal for activating said at least one short chain PFAS dedicated treatment stage when the provided information data include information data representative of the presence of at least one short chain PFAS, in particular data representative of the chemical formula of at least one short chain PFAS, and a signal for activating said at least one long chain PFAS dedicated treatment stage when the provided information data include information data representative of the presence of at least one long chain PFAS, in particular data representative of the chemical for-
mula of at least one long chain PFAS,
(C) transmitting said at least one activating signal to the
PFAS treatment unit to activate said at least one treat-
ment stage of the PFAS treatment unit, optionally to
activate the corresponding at least one PFAS treatment
stage chosen from a short and long chain PFAS dedi-
cated treatment stage, a short chain PFAS dedicated
treatment stage and a long chain PFAS dedicated treat-
ment stage, to remove at least a part of the PFAS from
the liquid effluent.

The method of the invention thus allows activating the
PFAS treatment unit only when necessary, which allows
reducing the maintenance of the PFAS unit, and the oper-
ating costs. Such activation occurs only when information
representative of the presence of PFAS is provided.

Advantageously, the method may comprise a further step
(D) of activating said at least one treatment stage of the
PFAS treatment unit, in particular in response to said trans-
mitted at least one activating signal, optionally activating the
corresponding at least one PFAS treatment stage chosen
from a short and long chain PFAS dedicated treatment stage,
a short chain PFAS dedicated treatment stage and a long
chain PFAS dedicated treatment stage, removing thereby at
least a part of the PFAS from the liquid effluent.

In particular, the PFAS treatment unit may include one or
more PFAS treatment stage, able to treat both short and long
chain PFAS, short chain PFAS and long chain PFAS. In such
a case, the activating signal activates said corresponding
PFAS treatment stage of the PFAS treatment unit. Each
treatment stage is then activated only when necessary. It
should be noted that several activating signals can be
generated for activating several PFAS dedicated treatment
stages to achieve a specific removal efficiency.

The liquid effluent to treat by the control system of the
present invention may be selected from raw water, urban
effluents, industrial effluents and two or more of these
effluents. Such effluent contains more than 50 vol % of
water, in general more than 60 vol % of water. In some
embodiments, the water content may be at least of 95 vol %,
or even at least of 99 vol %, for example up to 99.9 vol %,
or even up to 100 vol %. The water content may be within
any range defined by the previously cited limits. In general,
the remaining percents are solids, such as particles, sus-
pended matter, colloids, etc.

Advantageously, the PFAS treatment unit may comprise
at least one treatment stage chosen from a short chain PFAS
dedicated treatment stage and a long chain PFAS dedicated
treatment stage, such that the treatment stage specific to
short/long chain PFAS can be activated, in particular when
the provided information data include information data
representative of the chemical formula of at least one PFAS
which is a short/long chain PFAS. In such a case, a better
removal of the PFAS can be achieved as the treatment stage
is dedicated to the removal of the particular short/long chain
PFAS. This allows to attain a national regulation require-
ment for the content of PFAS in liquid effluent in a more
efficient and sure way, in particular when the considered
PFAS are present at a very low level in the liquid effluent.
Such specific treatment stages may require costly systems or
reagents such that the process of the invention allows further
cost reduction. Moreover, it is possible to choose to activate
one or the other PFAS treatment stage depending on the
PFAS present in the liquid effluent. As it is expected that the
content of liquid effluent in short chain PFAS will increase
to the detriment of long chain PFAS, the method of the
invention allows easy and efficient adaptation of the PFAS removal treatment to the liquid effluent. Finally, the control
system for PFAS removal of the present invention is pref-
erably intended to be integrated into a liquid effluent treat-
ment facility. In such a case, it is possible to change the
nature of the PFAS treatment unit or its reagent to be more
effective to remove PFAS identified in the liquid effluent to
treat, without stopping the whole liquid effluent treatment.

It should be noted that at least one of the treatment stage
may be a short and long chain dedicated treatment stage
which could be used in combination with the above men-
tioned short chain dedicated treatment stage and/or long
chain dedicated treatment stage, for example for treating a
part of the liquid effluent, the remaining of the effluent being
treated by one or several of other treatment stages of the
PFAS treatment unit.

The information data provided in step (A) may be infor-
mation data related to targeted PFAS, for example PFAS of
a registered list of targeted PFAS, this list including the
chemical formulas of targeted short chain PFAS, targeted
long chain PFAS, or both. Such a list may correspond to a
list of PFAS provided in a national regulation, for example
the US regulation or the coming EP regulation, or provided
by any other institution or company, or by plant operator as
a targeted list of PFAS to be specially controlled and treated.

Advantageously, step (A) for providing information data
may include:
  determining information data of the liquid effluent chosen
    among one or several of the following data: data
    representative of the presence of carbon-fluorine bonds,
    data representative of the presence of fluorine, data
    representative of the chemical formula of at least one
    PFAS, data representative of the concentration of at
    least one PFAS, data representative of the absence of
    PFAS and data representative of an estimated total
    concentration of targeted PFAS.

Most of these information data are non specific to a
particular PFAS, in the sense that they do not allow an
accurate identification of the PFAS, and only provide an
information of presence/absence of PFAS to allow activation
of the PFAS treatment unit when PFAS are detected, what-
ever the nature of the PFAS.

By this way, several kinds of information data may be
used to generate an activation signal in step (B). Information
data such as data representative of the presence of carbon-
fluorine bonds, data representative of the presence of fluo-
rine, data representative of the chemical formula and data
representative of an estimated total concentration of targeted
PFAS may be performed by non targeted analysis of the
liquid effluent, although targeted analysis is possible. By non
targeted analysis, we mean an analysis which provides
information on all the fluorinated compounds potentially
present in the liquid effluent, in opposition to a targeted
analysis which provides information on one or several
specific fluorinated compounds. In other words, the targeted
analysis is an analysis providing information data that can be
attributed to a specific targeted PFAS of known structure, i.e.
structurally identified. A targeted analysis thus allows
searching and quantifying one or several specific PFAS.
Such targeted analysis may be adapted to the analysis of a
single specific targeted PFAS or may be adapted to the
analysis of a group of specific targeted PFAS. On the
contrary, a non targeted analysis is an analysis providing
information data relative to a group of PFAS (which may be
part of a registered list of PFAS or not), and provides
information data that can only be attributed to this group of
PFAS, without possibility to attribute the data to any specific
PFAS contained in the group. Thus, in general, non targeted analysis does not allow to provide concentration data, or with a low accuracy, and do not allow to provide the exact structure of the compounds analyzed. On the contrary, targeted analysis is performed on one or several compounds structurally defined and provides an accurate measure of the concentration of the analyzed compounds.

The determination of the above information data may include, or consist of:

performing a targeted or non targeted analysis on the effluent and registering the data obtained, optionally obtaining information data extracted from the data registered by the non targeted analysis, comparing said registered data or said extracted information data with a pre-defined threshold or a pre-defined range, and providing information data representative of the presence/absence of PFAS when said registered data or said extracted information data are above/below the pre-defined threshold or within/outside the pre-defined range.

The pre-defined threshold may be fixed by regulation or user.

Registered data obtained from a targeted analysis may be data representative of the concentration of at least one PFAS. Registered data obtained from a non targeted analysis may be data representative of the presence of carbon-fluorine bonds, data representative of the presence of fluorine or data representative of the chemical formula.

The extracted information data may be a PFAS specific signal intensity, a PFAS specific signal surface, a sum of the intensities of a group of PFAS specific signals, a sum of the surfaces of a group of PFAS specific signals, a sum of the intensities of all PFAS specific signals.

The PFAS specific signal(s) and/or the pre-defined threshold and/or the predefined range may be determined by performing the same targeted or non-targeted analysis on effluents having different known concentrations of PFAS, in particular of PFAS of a registered list. This determination may result from a statistical analysis of the data registered by the targeted or non targeted analysis or from an analysis or comparison with data previously obtained from known effluents.

In one embodiment, the determination of the above information data may include, or consist of:

performing a non targeted analysis on the effluent and registering the data obtained, obtaining information data extracted from the data registered by the non targeted analysis, estimating a PFAS total concentration data, representing an estimated concentration of all the PFAS present in the effluent to treat, comparing said estimated PFAS total concentration data with a pre-defined threshold, and providing information data representative of the presence/absence of PFAS when said estimated PFAS total concentration data are above/below the pre-defined threshold The PFAS total concentration data may be estimated using a correlation previously established which correlates the extracted information data with a PFAS total concentration. This embodiment is particularly adapted to high resolution mass spectroscopy non targeted analysis.

It may be advantageous to be able to more specifically conduct the PFAS removal. Thus, in a preferred embodiment, step (A) for providing information data may include:

(i) determining at least one information data representative of the chemical formula of at least one PFAS present in the liquid effluent, (ii) a step of providing information data representative of the presence of PFAS, in particular when the at least one information data representative of the chemical formula is received, comprising:

identifying targeted PFAS present in the liquid effluent by comparing the received at least one information data representative of the chemical formula with a registered list of targeted PFAS, this list including the chemical formulas of targeted short chain PFAS, targeted long chain PFAS, or both, optionally providing concentration data representative of the concentration in the liquid effluent of the identified targeted PFAS, providing information data representative of the presence of identified targeted PFAS, in particular the presence of short chain targeted PFAS, long chain targeted PFAS or both, and optionally of their concentration.

In this embodiment, analysis of the PFAS is made in two steps: in a first step (i), the presence of PFAS is detected by means of an analysis allowing to know the chemical formula of PFAS, i.e. by a non targeted analysis as defined above. Such data representative of the chemical formula of at least one PFAS are for example molar mass data, obtained by mass spectroscopy. PFAS are present when the molar mass data correspond to the molar mass data of known PFAS, otherwise, PFAS are absent.

In a second step (ii), the method checks whether targeted PFAS are present: such a step allows in particular to identify if short and/or long chain PFAS have been detected in the first step by comparison with a registered list. For example molar mass data are compared to molar mass data of the targeted PFAS. If corresponding molar mass data are found, targeted PFAS are present, otherwise targeted PFAS are absent. The information data representative of the presence of identified targeted PFAS may thus specify if the targeted PFAS is a short/long chain, such that specific activation of a corresponding short/long chain dedicated treatment stage of the PFAS treatment unit is possible, in combination or not with the activation of a short and long chain dedicated treatment stage.

Preferably, when targeted PFAS have been identified, a targeted analysis on each of the identified targeted PFAS, or on some specific targeted PFAS, can be performed to determine their concentration in the liquid effluent. Step (A) for determining information data then include providing information data of the liquid effluent including data representative of the concentration of at least one PFAS chosen from a short chain PFAS and a long chain PFAS and step (B) may include:

generating said at least one signal for activating said at least one the short chain PFAS dedicated treatment stage when data representative of the concentration of one or several short chain PFAS are above a first threshold, specific for short chain PFAS, generating said at least one signal for activating said at least one long chain PFAS dedicated treatment stage when data representative of the concentration of one or several long chain PFAS are above a second threshold, specific for long chain PFAS, optionally generating at least one signal for activating said at least one short and long chain PFAS dedicated treatment stage.

The above mentioned threshold can be defined by legislation or by a user.

The activated signal generated is advantageously a signal activating one or more PFAS dedicated treatment stages having a removal efficiency sufficient to attain a pre-defined final concentration of short and/or long chain PFAS at its outlet towards the identified targeted PFAS or at least towards some specific targeted PFAS (for example the PFAS knows as difficult to remove and/or the removal of which is the most critical).

Alternatively, step (A) for providing information data may include determining information data of the liquid effluent including data representative of the concentration of at least one PFAS chosen from a short chain PFAS and a long chain PFAS. Such data may for example be obtained by means of a targeted analysis performed on the liquid effluent only for some particular PFAS (for example by LC-MS/MS) or by means of a non targeted analysis allowing a concentration determination (for example LC-HRMS).

Step (B) may then include generating activating signal for short/long chain PFAS, as above.

Whatever the embodiment, step B) may include a step for selecting at least one treatment stage, in particular treatment stage(s) having the highest removal efficiency preferably at the best cost, to remove PFAS, such as long and/or short chain PFAS when their presence has been detected. Then at least one activation signal is generated for activating the selected treatment stage(s) of the PFAS treatment unit.

This selection step can be performed by means of a model using a data base previously constructed, such data base comprising:

information data characteristics of the effluent to treat, such as the pH (as determined by standard ISO 10523: 2008), the mineralization level (determined by a conductivity measurement using standard ISO 7888:1985), the total organic carbon (as determined by standard ISO 8245:1999), PFAS analysis of the same effluent, and more specifically concentration of one or several PFAS or of all the PFAS present in the effluent, for example obtained from a targeted analysis, treatment performances of each treatment stage for PFAS removal depending on the operating conditions, optionally, the cost of each treatment stage.

This data base can be built from compilation of results of lab-scale and pilot-scale tests. Such data base can be enriched continuously by the results of the PFAS treatment unit controlled.

In this data base, each PFAS (of a registered list or not) or a group of several PFAS (registered or not), is/are associated to a list of treatments suitable for their removal, and the data base contains, for each treatment, and for several removal efficiencies values of the concerned PFAS, the concentration of said concerned PFAS at the inlet of the treatment, the concentration of said concerned PFAS at the outlet of the treatment, the treatment duration and reagent consumption where applicable, necessary for obtaining each of the removal efficiencies, and optionally the treatment cost associated. PFAS treatment conditions and performances (removal efficiency, inlet and outlet concentrations) can be edited for each of a list of targeted PFAS compounds. Performances of PFAS removal of each treatment stage can be predicted based on the experimental produced data and through a modeling approach. This modelling can use different approaches: statistical model applied on experimental data base, Freundlich-Langmuir for adsorption on activated carbon, biochar or activated biochar, clay (organoclays or inorganic-organic clays) and cyclodextrin polymer and Lin & Huang model for removal on resins. It should be noted that the same data base may also be used for controlling the operating conditions of the PFAS treatment unit.

The model then selects, depending on a concentration of PFAS, in particular of targeted PFAS, at the inlet of the PFAS treatment unit, the treatment stage(s) for example allowing the highest removal efficiency at the best cost or for a predefined cost, in particular for a pre-defined list of PFAS, such as PFAS of a registered list of targeted PFAS and/or for targeted PFAS the removal of which is considered as critical. The PFAS concentration(s) at the inlet of the PFAS treatment unit are typically obtained from a targeted analysis of the effluent for a predefined list of PFAS, for example provided in step A) or in an intermediate step.

In a preferred embodiment, the method may include a further intermediate step after step A) and before step B) or included into step A), in which a targeted analysis is performed on at least one targeted PFAS, for example from a registered list, to determine inlet concentration of said targeted PFAS in the liquid effluent. Preferably, said at least one targeted PFAS may be a PFAS considered as critical to remove by a regulation or a user.

In this embodiment, the generation of the activated signal in step B) may include:

selecting a treatment or a combination of treatments by means of a model using a previously built data base and:

for each targeted PFAS, said data base associates to a plurality of inlet concentrations, one or several treatments stages, their removal efficiency, their duration, their reagent consumption if applicable, and an overall cost of the treatment, and and said model selects a treatment or a combination of treatments to use as:

the least costly for a specific removal efficiency and for the inlet concentration determined in the intermediate step, or having the highest removal efficiency for a specific cost and for the inlet concentration determined in the intermediate step, or having the highest removal efficiency towards one or several specific PFAS, for example critical to remove, for the inlet concentration of these specific PFAS determined in the intermediate step, generating a signal for activating the selected treatment(s).

Alternatively, the intermediate step may include:

classifying information data extracted from data registered by a non targeted analysis in step A) in at least two groups of data previously defined, each group of data corresponding to a set of PFAS (for example PFAS of a registered list, preferably PFAS considered as critical to remove), performing a targeted analysis on at least one targeted PFAS, for example from the registered list, to determine inlet concentration of each targeted PFAS in the liquid effluent, preferably on all the targeted PFAS of a registered list, selecting the group having the higher content of PFAS, for example by summing inlet concentrations of all the PFAS of a group on which a targeted analysis has been performed.

Then the generation of the activated signal in step B) may include:

selecting a treatment or a combination of treatments by means of a model using a previously built data base and:

in each group of data, for each PFAS, said data base associates to a plurality of inlet concentrations, one or several treatments stages, their removal efficiency, their duration, their reagent consumption if applicable, and an overall cost of the treatment, and the model selects a treatment or a combination of treatments to use a:

the least costly for a specific removal efficiency and for the inlet concentration determined in the intermediate step, for all the PFAS of the selected group, or having the highest removal efficiency for a specific cost and for the inlet concentration determined in the intermediate step, for all the PFAS of the selected group, or having the highest removal efficiency towards one or several specific PFAS, for example critical to remove, present is the selected group, for the inlet concentration of these specific PFAS determined in the intermediate step generating a signal for activating the selected treatment(s).

The above mentioned classification may be a classification based on the chain length of the PFAS, and optionally on the polarity of the PFAS, or based on any other specific property of a PFAS that may have an influence on the treatment efficiency, such as the charge of the PFAS. For example a first set of PFAS forming a first group may include the short chain PFAS, a second set of PFAS forming a second group may include apolar long chain PFAS, a third set of PFAS forming a third group may include polar long chain PFAS.

The method may further comprise a step (E) for:

generating at least one deactivating signal in response to information data representative of the absence of PFAS provided in step (A), transmitting said at least one deactivating signal to a previously activated PFAS treatment unit, deactivating the previously activated PFAS treatment unit.

It should be noted that step (A) may be reiterated continuously within a defined period of time, steps (B), (C), (D) being performed when information data representative of the presence of PFAS are provided in step (A), step (E) being performed when information data representative of the absence of PFAS are provided in step (A) only if the PFAS treatment unit has been previously activated.

Once activated, operating conditions of the PFAS treatment unit, and optionally its stop, in particular of each of its treatment stages, may be controlled as a function of one or several parameters chosen among identified PFAS, PFAS concentration (in particular inlet PFAS concentration and outlet PFAS concentration), efficiency of the removal, other pollutants contained in the liquid effluent to treat.

Such control may include:

monitoring PFAS concentration in the effluent before and after the PFAS treatment unit, in particular before and after each of its treatment stages, to obtain a specific PFAS removal efficiency, adapting the operating conditions of each treatment stage to reach a targeted outlet concentration of PFAS at the PFAS treatment unit, in particular at the outlet of each treatment stage, for example by using a model, deactivating the PFAS treatment unit when an information data representative of the absence of PFAS in a liquid effluent to treat is provided by step A).

The monitoring of the PFAS concentration in the effluent before and after the PFAS treatment unit is for example performed by a targeted analysis, preferably an online targeted analysis. Such concentration monitoring may use information data representative of the concentration of at least one PFAS optionally provided in step A) as PFAS concentration in the effluent before the PFAS treatment.

Such control of the operating conditions may be performed by means of a model. Such control may also include deactivation of the PFAS treatment unit, in particular of each of its treatment stages, for example when the PFAS concentration at the inlet of the PFAS treatment unit.

Operating conditions may include for treatment in which liquid effluent is contacted with at least one reagent, the number of different reagents to use (separately or in mixture), the amount of each reagent used, contact time, the flow of effluent. For nanofiltration and reverse osmosis, operating conditions include conversion rate, applied pressure and dosage of acid and anti-scaling as reagents.

The model may allow controlling these operating conditions as a function of one or several of the following parameters: the PFAS to treat (short/long chain), their concentration, the efficiency of the removal wanted, the other pollutants contained in the liquid effluent to treat (organic matter, salts). Such model may be constructed from experimental data obtained by testing (for example by isothermal and kinetic tests, in batch or column or in pilots), from statistical analysis of experimental data (for example by correlation between the removal efficiency as a function of operating conditions), from theoretical models such as Freundlich-Langmuir adsorption models, or from a combination of one or more of these construction methods. Advantageously, the model may associate, for each effluent to treat (having for example PFAS to treat (short/long chain) and optionally other pollutants), a concentration of PFAS at the inlet of the PFAS treatment unit (in particular at each inlet of its treatment stages) and a targeted concentration at the outlet of the PFAS treatment unit (in particular at each inlet of its treatment stages) to operating conditions. Such model may use a previously built data base comprising operating conditions, removal efficiency, optionally costs, for several concentrations of several specific PFAS to remove. In particular the model may use a data base previously constructed, as the one detailed above.

Treatment Stage of the PFAS Treatment Unit

During activation of the PFAS treatment unit, the liquid effluent may be submitted to at least one of the following treatments which are PFAS removal treatments:

a treatment in which the liquid effluent is contacted with at least one reagent dedicated to remove the PFAS by ionic exchange, adsorption or both, said reagent may be chosen among a reagent dedicated to remove long chain PFAS, a reagent dedicated to remove short chain PFAS and a reagent dedicated to remove short and long chain PFAS, preferably among the two first cited reagents, said at least one reagent being preferably in granular or powder form, a nanofiltration, a reverse osmosis.

The reagents may be in powder or granular form. A powder can be defined as grains having a size of less than 0.1 mm. Using a reagent in powder form allows a quicker kinetic of the treatment with respect to a reagent in granular form, and a variation in the dosage of the reagent.

Concerning the treatment stage in which the liquid effluent is contacted with at least one reagent, said reagent may be dedicated to remove targeted PFAS (short and/or long chain PFAS) which are listed in the above mentioned registered list. Nanofiltration and reverse osmosis treatments are adapted for removal of both short and long chain PFAS.

The at least one reagent dedicated to remove PFAS may be chosen from:

- a cyclodextrin polymer, in particular a porous cyclodextrin polymer, supported or not on a solid substrate,
- activated carbon, in particular granulated or powdered activated carbon,
- organoclays, in particular positively charged,
- inorganic-organic clays, in particular positively charged,
- anion exchange resins, in particular strongly basic anion exchange resins,
- biochar or activated biochar.

Treatments dedicated for long chain PFAS removal are:
Nanofiltration and reverse osmosis treatments,
Treatments using any of the reagents listed above.
Treatments dedicated for short chain PFAS removal are:
Nanofiltration and reverse osmosis treatments,
Treatments using reagents chosen from cyclodextrin polymers (supported on not) and anion exchange resins.

The efficiency removal of the above treatments for long, short or both long and short chain PFAS may be set to attain a pre-defined final concentration of long, short or both long and short chain PFAS under appropriate operating conditions. The removal efficiency and these operating conditions may be determined by lab tests, pilot tests and modelling as previously explained.

The costs involved by implementation of these removal treatments can be classified as follows, from the least costly to the more costly: biochar, activated biochar<organoclays, inorganic-organic clays<cyclodextrin polymers<activated carbon<anion exchange resins<nanofiltration, reverse osmosis.

The removal treatment(s) may be selected as described above, by means of a model using a data base constructed by analyses and treatments.

In a preferred embodiment, cyclodextrin polymers (supported on not) and/or organoclays may be used, in particular for short chain PFAS removal.

Cyclodextrin polymer (porous or not), cyclodextrin polymer (porous or not) supported on a solid substrate and anion exchange resins are efficient for removing short chain PFAS.

Activated carbon, organoclays, inorganic-organic clays and anion exchange resins are efficient for removing long chain PFAS.

Reagents that can be used in the present invention are detailed below. Examples of reagents of the above families efficient for PFAS removal are disclosed into D. Q. Zhang, Science of the Total Environment 694 (2019)133606, incorporated by reference.

Anion Exchange Resins

Anion exchange resins have a polymeric matrix made up of a network of cross-linked polymers to which charged or ionizable functional groups are attached, in general by a covalent bond. The cross-linking is typically accomplished with the use of divinylbenzene. The polymeric matrix may be chosen among polyacrylic polymers, polystyrene polymers, polystyrene-divinyl-benzene (PS-DVB) copolymers. Advantageously, strongly basic anionic resins may be chosen for the removal of PFAS, in particular of short chain PFAS. Strongly basic anionic resins usually have functional groups with pk values of 13 or more. These strongly basic resins will exchange anions in both acid and alkaline solutions. Moreover, the functional group may preferably be hydrophobic for PFAS removal efficiency. It has indeed be shown that the higher the hydrophobicity of the functional group of the resin, the higher is the sorption capacity for both short and long chain PFAS (A. Zaggia et al, Water Research 91 (2016) 137-146).

Generally, in strongly basic anionic resins, the functional group is a quaternary ammonium group. Preferably, the quaternary ammonium groups may be alkyl or alkyl-alkanol substituted quaternary ammonium groups, such as for example triethylammonium (CAS 17440-81-2), trimethylammonium ($—N^+(CH_3)_3$) dimethylhydroxyethylammonium ($—N^+(CH_3)_2(C_2H_4OH)$). Standard commercially available exchangers contain either $—N^+(CH_3)_3$ groups (type 1 resins) or $—N^+(CH_3)_2C_2H_4OH$ groups (type 2 resins).

The anion present in the exchange resins may preferably be hydroxyl or chlorine groups.

The polymeric matrix may be in the form of a gel matrix or a microporous matrix, such as commercial resins Purolite® A-600, A 520, A 532. The commercial anionic resin PS-DVB gel-A532, with high hydrophobic property is particularly efficient for PFAS removal, including small chain PFAS.

Regeneration of the anion exchange resins may be performed with usual reagents such as MeOH, EtOH and NaCl or $NH_4$—Cl or $NH_4$—OH.

Modified Clays

Clay minerals are phyllosilicates having a naturally occurring layered structure in which negatively charged layered structures or sheets are held together by monovalent cations (sodium, potassium, lithium, . . . ) or bivalent cations (calcium, magnesium, baryum . . . ) or other inorganic cations sitting in anionic galleries between the sheets. The cations can be exchanged by other organic/inorganic cations.

In the present invention, modified clays may be used for PFAS removal. Modified clays are phyllosilicates to which a modifier has been added. Preferred modified clays are modified montmorillonites, and among montmorillonites, bentonite. These modified clays include organoclays and inorganic-organic clays.

Organoclays are phyllosilicates to which at least one organic modifier has been added. These organic modifiers can be present on the surface of the clay, intercalated between the layers, or both.

The organic modifier may be chosen among organic cations, organosilanes, chelating agents, nonionic surfactants, zwitterionic surfactants, or combinations or two or more of them. The organic cations may include cationic surfactants and cationic polymers. Advantageously, organic cations may be alkylammonium cations, in particular quaternary alkylammonium cations. Examples of organic cations are tetramethylammonium (TMA, CAS N° 51-92-3)), hexadecyltrimethylammonium (CAS N° 6899-10-1), crystal violet (CAS N° 458-62-9), methylene blue (CAS N° 61-73-4).

Preferably, for improving PFAS removal efficiency, organoclays may be modified by at least one cationic modifier, in particular an organic cation.

Inorganic-organic clays are phyllosilicates to which at least one organic modifier and at least one inorganic modifier has been added. The organic modifier can be as described above. Inorganic modifier can be oxides, nanoparticles, inorganic cations such as hydroxymetal cations and metallic cations. Inorganic-organic clays may contain magnetic inorganic modifier to ease separation of the clay from the liquid effluent to treat. Preferably, for improving PFAS removal efficiency, inorganic-organic clays may be modified by at least one cationic modifier.

Types I, II or III or inorganic-organic clays described into Runliang Zhu et al, Applied Clay Science 123 (2016) 239-258, may be used to remove PFAS, in particular those modified with cationic compounds. It may be noted that steric hindrance of the modifier intercalated between the layers of the clays may be chosen to control the interlayer space and to tune the modified clay for specific removal of short or long chain PFA.

Cyclodextrin Polymers and Cyclodextrin Polymers Supported on a Solid Substrate

Cyclodextrins (noted "CDs" hereafter) are a group of structurally related natural products formed during bacterial digestion of cellulose. CDs are macrocyclic molecules, more specifically cyclic oligosaccharides consisting of ($\alpha$-1,4)-linked $\alpha$-D-glucopyranose units and contain a somewhat lipophilic central cavity and a hydrophilic outer surface. CDs have a low-polarity cavity in which organic pollutant of appropriate shape and size can form inclusion complexes. The natural $\alpha$-, $\beta$- and $\gamma$-cyclodextrin consist of six, seven, and eight glucopyranose units, respectively. Other CDs with less than 6 and more than 8 units, can be isolated or synthetized.

Cyclodextrins used in the present invention may include cyclodextrin derivatives. The derivatives of cyclodextrin consist mainly of molecules wherein some of the —OH groups are converted to —OR groups. The —OR group can be a variety of functional groups, such as e.g., halide, acid halide, ester, or activated ester. The cyclodextrin derivatives can, for example, have one or more additional moieties that provide additional functionality, such as desirable solubility behavior and affinity characteristics. Examples of derivatives or modified CDs are cited in WO2018/200857 (incorporated by reference).

Cyclodextrin polymers consist of two or more cyclodextrin macromolecules covalently bonded to each other using a cross-linker. These cyclodextrin macromolecules can be natural or synthesized CDs, and optionally their derivatives. However, in a preferred embodiment, natural CD is used.

Examples of cross-linkers that may be used to prepare CD polymers for PFAS removal include an aryl group, epichloridrin and urethane containing methacrylate. $\beta$-CD polymers show a good efficiency for FPAS removal, in particular small C-chain (C4-C6) and medium (C7-10) PFAS. However, other CD macromolecules may be envisaged with different size cavity for short/long chain PFAS for preparing CD polymers.

The aryl group is derived from an aryl compound that can react with a cyclodextrin to form an aryl ether bond. The aryl crosslinking moiety may comprise one or more electron withdrawing group (e.g., a halide group, such as —Cl and —F, —NO$_2$, and —CN group). The electron withdrawing groups can be the same or different. Without intending to be bound by any particular theory, it is considered that the electron withdrawing group(s) facilitates a nucleophilic aromatic substitution reaction between the cyclodextrin and aryl compound. In various embodiments, the aryl group has 0, 1, or 2 cyano groups and, optionally, 0, 1, 2, 3, or 4 halide groups. In a preferred embodiment, the aryl group is an aryl fluoride. Aryl fluoride may be selected from the group consisting of tetrafluoroterephthalonitrile, decafluorobiphenyl, octafluoronaphtalene and combinations thereof, preferably decafluorobiphenyl.

Aryl fluoride cross-linkers are preferred as porous CD polymers (P-CDP) can be obtained, as disclosed in US20160304630A1 (incorporated by reference). Advanta-geously, P-CDPs can be regenerated by washing with benign solvents at ambient temperatures with no loss in performance after at least five cycles. The PFAS removal efficiency can be improved by lowering the concentration of phenolates in the P-CDP and by appropriate choice of the aryl fluoride.

Urethane containing methacrylate cross-linker may be 2-Isocyanatoethyl methacrylate.

Examples of polymeric support that can be used more specifically for PFAS removal are epichlorohydrin (EPI), decafluorobiphenyl (DFB) and 2-Isocyanatoethyl methacrylate (IEM) (see Leilei Xiao et al, *Macromolecules* 2019, 52, 10, 3747-3752). By way of example, EPI-CD may be used for removal of small PFAS, DFB-CD may be used for removal of PFAS in general, and more specifically for removal of C6-C10 PFAS and specially for PFOA.

For further efficiency of PFAS removal, the cross-linker may be functionalized with a quaternary ammonium cation, similar to those used in modified organoclays.

The above CD polymers (porous or not porous) may be covalently bonded to a solid substrate, as disclosed in WO2018/200857. The solid substrates cited in this document may be envisaged.

The CD polymers present the advantage to require a short contact time for PFAS removal (below 5 min) whereas more than 10 minutes are required for conventional activated carbon.

CD polymers present the advantage to have hydrophilicity due to the organic cross-linker and hydrophobicity (inside the CD cavity) which may favor PFAS removal. Moreover, P-CDP have two kinds of porosity: one lied to the cross-linker and the other lied to the CD cavity, the porosity of the porous polymer being larger than the porosity of the CD cavity.

Finally, CD polymers are cost attractive with respect to conventional activated carbon.

Activated Carbon

Activated carbon is a material consisting essentially of carbonaceous material with a porous structure. It can be produced in a known manner by pyrolysis of precursors of natural origin (wood, bark, coconut shells, coal, peat, cotton, organic materials of various origins, etc.) or of synthetic origin (polyacrylonitrile (PAN), aramid fibres, etc.) already containing a significant proportion of carbon, this pyrolysis step being followed by a chemical or physical activation step.

Activated carbon is generally effective for removing long-chain PFAS via hydrophobic interaction. Powdered (PAC), superfine powdered (SAC) or granular (GAC) activated carbon may be used for PFAS removal.

Biochar

Biochar may also be used for PFAS removal. Biochar is a composition comprising a pyrolyzed biomass biochar, a hydrothermal carbonization-produced biomass biochar, or a combination thereof. The biomass may be selected from agricultural crop waste, forestry waste, algae, animal or human waste, industrial waste, municipal waste, anaerobic digester waste, plant materials grown for the production of biomass, or a combination thereof. By way of example, biochars made from hardwood and pinewood may be envisaged. Biochar from rice husks may also be envisaged, in powder/granular form or in fiber form as in US2019270041A1A1.

The biochar may be a powdered solid or granules.

Biochar may further comprise a metal salt powder or granule. The metal salt may comprise iron, aluminum, calcium, magnesium, manganese, zinc, copper or a combination thereof, and in some examples, the metal salt comprises ferrous or ferric cations, ferrate anions, or a combination thereof. In particular embodiments, the metal salt comprises ferric chloride.

PFAS Treatment Unit

The PFAS treatment unit to activate may comprise at least one vessel to implement one or several treatment stages, mounted in parallel and/or in series.

In particular, a treatment stage by reagent contact may comprise at least one vessel in which the liquid effluent to treat is contacted with at least one reagent to implement the short chain PFAS dedicated treatment stage and the long chain PFAS dedicated treatment stage. Such vessel is typically packed with one or more reagents. Alternatively, at least two vessels in series, at least one dedicated to the short chain PFA dedicated treatment stage and at least one dedicated to the long chain PFA dedicated treatment stage, may be provided.

A treatment stage by nanofiltration and/or reverse osmosis may comprise at least one vessel chosen from a vessel dedicated to nanofiltration and a vessel dedicated to reverse osmosis. Such vessel typically comprises one or more filtration membrane (nanofiltration or reverse osmosis membrane(s)). Such vessels dedicated to nanofiltration and/or reverse osmosis may preferably be mounted in parallel.

One or several vessels dedicated to nanofiltration and/or reverse osmosis may preferably be mounted in parallel with one or several vessels dedicated to a treatment stage by reagent contact, the latter being eventually mounted in series, in particular for treatment in separated vessels of short and long chain PFAS.

Analysis of the Liquid Effluent

Step (A) of the method according to the invention may include:

performing on the liquid effluent to treat a non targeted analysis, and generating information data chosen among one or several of the following data: data representative of the presence of carbon-fluorine bonds, data representative of the presence of fluorine, data representative of the chemical formula of at least one PFAS present in the liquid effluent to treat, in particular of all the PFAS present, and data representative of an estimated total concentration of targeted PFAS.

optionally:

identifying targeted PFAS present in the liquid effluent by comparing the information data generated by the non targeted analysis with a registered list of targeted PFAS, this list including the chemical formulas of targeted short chain PFAS, targeted long chain PFAS, or both, performing on the liquid effluent to treat a targeted analysis and generating information data representative of the concentration of targeted PFAS identified in the liquid effluent.

Information data representative of the presence/absence of PFAS in a liquid effluent to treat may correspond to data representative of an estimated total concentration of targeted PFAS above/below a predetermined threshold.

Information data representative of the presence of carbon-fluorine bonds or representative of the presence of fluorine (PFAS signal intensity and/or surface) may be considered as representative of the presence of PFAS when they are above a predetermined threshold, as detailed previously.

Step A) may further include a targeted analysis performed on at least one targeted PFAS, for example from a registered list, to determine inlet concentration of said targeted PFAS in the liquid effluent, as previously disclosed.

The non targeted analysis (or inclusive analysis) is adapted for providing a screening of PFAS present in the liquid effluent. Information data provided by non targeted analysis include data representative of the presence of carbon-fluorine bonds, data representative of the presence of fluorine and data representative of the chemical formula of at least one PFAS present in the liquid effluent to treat, in particular of all the PFAS present. When no PFAS are present, data representative of the absence of PFAS may be provided by the non targeted analysis.

The non targeted analysis may be chosen among a high resolution mass spectrometry analysis, combustion ion chromatography (CIC), Particle-induced gamma ray emission spectroscopy (PIGE), fluorine nucleic magnetic resonance (NMR) and their combination.

CIC methods allow determining a total concentration of fluorine. This method does not differentiate between organic and inorganic fluorine. Eventually, CIC may be performed after isolation of an organic fluorine fraction by ion pairing methods. For example, weak anion exchange solid-phase extraction is used to remove fluoride and other impurities from the sample before CIC analysis, selecting for anionic and neutral organofluorines.

PIGE allow measuring total fluoride in liquid effluent.

Fluorine ($F^{19}$) NMR allows measuring total fluorine in the liquid effluent.

The targeted analysis allows quantification of one or several targeted PFAS. The information data provided therefor include information data representative of the concentration of targeted PFAS identified in the liquid effluent.

The targeted analysis may be chosen among liquid chromatography (LC) with either high resolution spectrometry (HRMS, e.g. quadrupole time-of-flight; Q-TOF) or tandem mass spectrometry (MS/MS). Such targeted analysis is usually performed using analytical standards of the targeted compounds. Total oxidizable precursor assay (developed by Erika F Houtz, David L Sedlak) may also be used. In this assay, samples are exposed to hydroxyl radicals generated by thermolysis of persulfate under basic pH conditions and perfluoroalkyl acid (PFAA) precursors are transformed to PFCAs of related perfluorinated chain length. By comparing PFCA concentrations before and after oxidation, the concentrations of total PFAA precursors can be inferred. LC-HRMS and LC-MS/MS are however preferred.

In particular, the data representative of an estimated total concentration of targeted PFAS may be generated using a correlation which correlates a global intensity of a graph obtained by a non targeted analysis to the total concentration of the targeted PFAS. Said correlation may be previously determined by a statistical method from analysis of effluents having known contents of targeted PFAS by means of said non targeted analysis and from a targeted analysis of the targeted PFAS. In a preferred embodiment, this non targeted analysis is a high resolution mass spectrometry analysis.

Computer Program Product

According to one aspect, a computer program is also provided comprising the instructions for carrying out the steps of the method of the invention when said instructions are executed by one or more processors, in particular programmed to execute said steps. The above methods may indeed be implemented in a treatment device such as a processor, for example a microprocessor, a microcontroller or else.

According to another aspect, the invention provides a computer-readable medium having stored thereon the above computer program.

"Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. This concept includes not only such a computer-readable medium as a hard disk which is connected to a CPU and with which the recorded program is directly executed, but also such a computer-readable medium as CD-ROM which records a program to be executed after installing it on a hard disk. A program here includes not only a program which can be directly executed, but also a source format program, compressed program and enciphered program.

Control System

The control system of the present invention may be introduced into a liquid effluent treatment facility. Another object of the invention may therefore concern a liquid effluent treatment facility including a control system as described above. Such control system may be designed as a mobile control system for easier use and easy integration in any treatment facility.

According to another aspect, a control system for PFAS removal from a liquid effluent is proposed, comprising:

a PFAS treatment unit dedicated to the removal of perfluoroalkyls and polyfluoroalkyl substances PFAS, said PFAS treatment unit including at least one treatment stage optionally chosen from a short and long chain PFAS dedicated treatment stage, a short chain PFAS dedicated treatment stage and a long chain PFAS dedicated treatment stage, a control unit configured to:

provide information data representative of the presence or absence of PFAS in a liquid effluent to treat, generate at least one activating signal for activating the PFAS treatment unit when the provided information data indicate the presence of PFAS chosen from short chain PFAS, long chain PFAS and short and long chain PFAS, optionally chosen from:

a signal for activating said at least one short and long chain PFAS dedicated treatment stage when the provided information data include information data representative of the presence of at least one PFAS chosen from short chain PFAS, long chain PFAS and short and long chain PFAS, a signal for activating said at least one short chain PFAS dedicated treatment stage when the provided information data include information data representative of presence of at least one short chain PFAS, in particular data representative of the chemical formula of at least one short chain PFAS, and a signal for activating said at least one long chain PFAS dedicated treatment stage when the provided information data include information data representative of the presence of at least one long chain PFAS, in particular data representative of the chemical formula of at least one long chain PFAS, transmit said at least one activating signal to the PFAS treatment unit to activate the PFAS treatment unit, optionally the corresponding at least one PFAS treatment stage chosen from a short and long chain PFAS dedicated treatment stage, a short chain PFAS dedicated treatment stage and a long chain PFAS dedicated treatment stage, to remove from the liquid effluent to treat at least a part of the PFAS.

In particular, the control system is configured to implement the method of the present invention, in particular all the steps A)-E) of the method of the present invention in any their embodiments.

Advantageously, the control unit may be configured to activate the PFAS treatment unit, in particular in response to said transmission at least one activating signal, optionally to activate a corresponding at least one PFAS treatment stage chosen from a short and long chain PFAS dedicated treatment stage, a short chain PFAS dedicated treatment stage and a long chain PFAS dedicated treatment stage, removing thereby at least a part of the PFAS from the liquid effluent to treat.

Advantageously, the control unit may be configured to provide information data by:

determining information data of the liquid effluent chosen among one or several of the following data: data representative of the presence of carbon-fluorine bonds, data representative of the presence of fluorine, data representative of the chemical formula of at least one PFAS, data representative of the concentration of at least one PFAS, data representative of the absence of PFAS and data representative of an estimated total concentration of targeted PFAS.

Advantageously, the control unit may be configured to provide information data by the above determining step as disclosed with any embodiment detailed with respect to the method.

Advantageously, alternatively or in combination, the control unit may be configured to provide information data by:

(i) determining at least one information data representative of the chemical formula of at least one PFAS present in the liquid effluent, (ii) providing information data representative of the presence of PFAS, in particular when the at least one information data representative of the chemical formula is received, comprising:

identifying targeted PFAS present in the liquid effluent by comparing the received at least one information data representative of the chemical formula with a registered list of targeted PFAS, this list including the chemical formulas of targeted short chain PFAS, targeted long chain PFAS, or both, optionally providing concentration data representative of the concentration in the liquid effluent of the identified targeted PFAS, providing information data representative of the presence of the identified targeted PFAS, in particular the presence of short chain targeted PFAS, long chain targeted PFAS or both, and optionally of their concentration.

For better PFAS efficient removal, the control unit may also be configured for determining information data of the liquid effluent including information data representative of the concentration of at least one PFAS chosen from a short chain PFAS and a long chain PFA, and for generating said at least one signal for activating said at least one short chain PFAS dedicated treatment stage when data representative of the concentration of one or several short chain PFAS are above a first threshold, specific for short chain PFAS and/or for generating said at least one signal for activating said at least one long chain PFAS dedicated treatment stage when data representative of the concentration of one or several long chain PFAS are above a second threshold, specific for long chain PFAS, optionally generating at least one signal for activating said at least one short and long chain PFAS dedicated treatment stage.

Typically, the information data representative of the concentration are obtained by a targeted analysis and compared with a threshold defined by the legislation or a user, above/below which it is considered these information data are representative of the presence/absence of PFAS. When a presence is detected, an activating signal is generated, when absence is detected, no activating signal is generated. Step A) is preferably continuously reiterated within a defined period of time to check the presence/absence of PFAS and to generate one or more activating signals where applicable.

The control system may further comprise a pilot unit configured to control operating conditions of the PFAS treatment unit as a function of one or several parameters chosen among identified PFAS, PFAS concentration (in particular inlet PFAS concentration and outlet PFAS concentration), efficiency of the removal, other pollutants contained in the liquid effluent to treat, as explained in reference to the method. This pilot unit may be configured to control the operating conditions mentioned in reference to the method.

Advantageously, the PFAS treatment unit may comprise at least one of the following features:
- at least one vessel to implement said at least one treatment stage, optionally chosen from the short and long chain dedicated treatment stage, the short chain PFAS dedicated treatment stage and the long chain PFAS dedicated treatment stage,
- at least two vessels in series and/or in parallel, at least one vessel dedicated to at least one treatment stage, optionally a short chain PFA dedicated treatment stage, and at least another vessel dedicated to at least one other treatment stage, optionally a long chain PFA dedicated treatment stage.

Advantageously, the PFAS treatment unit may comprise at least one reagent dedicated to remove the PFAS by ionic exchange, adsorption or both, said reagent being chosen among a reagent dedicated to remove long chain PFAS, a reagent dedicated to remove short chain PFAS and a reagent dedicated to remove short and long chain PFAS, preferably among the two first cited reagents, said at least one reagent being preferably in granular or powder form.

In particular, the at least one reagent dedicated to remove PFAS may be chosen from the list already given with respect to the method of the invention.

Advantageously, the control system of the invention may further comprise:
- an analysis unit including at least one apparatus for performing a non targeted analysis of the liquid effluent to treat, and generating information chosen among one or several of the following data: data representative of the presence of carbon-fluorine bonds, data representative of the presence of fluorine, data representative of the chemical formula of at least one PFAS present in the liquid effluent to treat, in particular of all the PFAS present and data representative of an estimated total concentration of targeted PFAS. When no PFAS is present, data representative of the absence of PFAS may be provided.

Optionally, the control system may further comprise at least one apparatus for performing a targeted analysis of the liquid effluent to treat and generating information data representative of the concentration of PFAS identified in the liquid effluent, in particular of identified targeted PFAS. Optionally, the control system may be configured to identify targeted PFAS present in the liquid effluent by comparing the information data generated by the non targeted analysis with a registered list of targeted PFAS, this list including the chemical formulas of targeted short chain PFAS, targeted long chain PFAS, or both.

DESCRIPTION OF THE DRAWINGS

The invention will be better understood with reference to the figures, which show exemplary embodiments of the invention.

FIG. 2 is a flowchart of an embodiment of the method of the invention.

Figure 1:
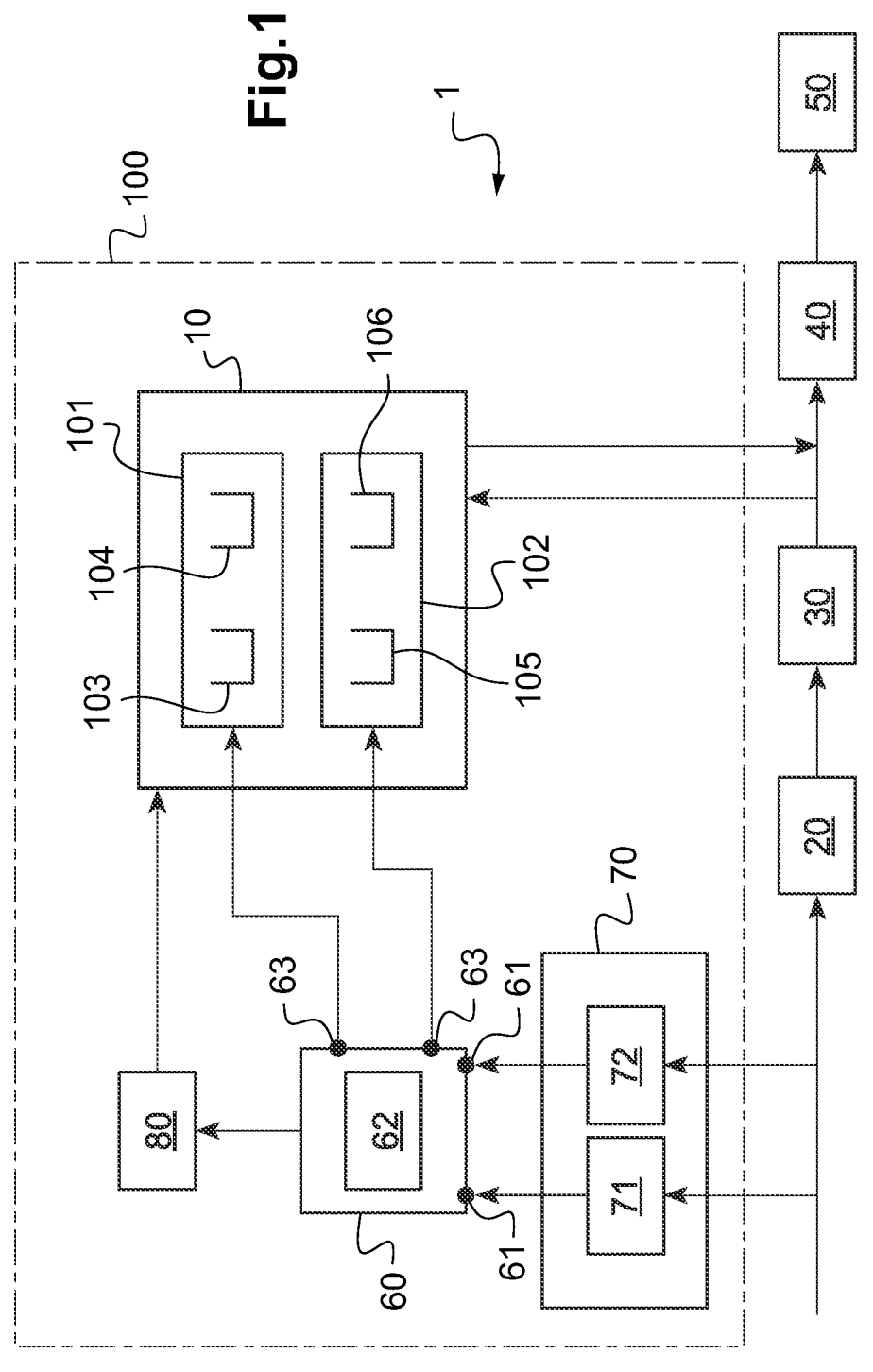
FIG. 1 represents schematically a liquid effluent treatment facility including a control system according to one embodiment.

On FIG. 1, a liquid effluent treatment facility 1 is represented, here a water treatment facility for producing drinking water from surface water.

The water treatment facility 1 comprises a PFAS treatment unit 10. It also typically includes a coagulation-flocculation unit 20, a sedimentation or flotation unit 30, a filtration unit 40 and a tank 50.

The PFAS treatment unit 10 is here mounted in derivation ahead from the filtration unit 40, but could be positioned before or after the coagulation-flocculation unit 20, before or after the sedimentation or flotation unit 30, or as part of the sedimentation or flotation unit 30, or as part of the filtration unit 40.

The position of the unit 10 within the treatment facility 1 is depending on the reagent configuration within unit 10 when this unit includes a treatment stage by contacting with a reagent.

For a powdered reagent, unit 10 can be positioned before or after unit 20, or as part of sedimentation or flotation unit 30. For granular reagent, unit 10 can be positioned before or after unit 40 or combined with it when this unit is based on membrane.

The filtration unit 40 may be a microfiltration or ultrafiltration unit, using organic or ceramic membranes, optionally vacuum driven membranes. The use of the PFAS treatment unit 10 ahead from the filtration unit 40 can be useful to limit the fouling of the membrane and also to enhance the production rate of the filtration unit 40.

The PFAS treatment unit 10 may also be designed to be a mobile unit that can be connected in derivation at any appropriate point of the water treatment facility 1.

The PFAS treatment unit 10 includes at least one treatment stage, here a short chain PFAS dedicated treatment stage 101 and a long chain PFAS dedicated treatment stage 102. The invention is of course not limited by the number of treatment stages or their nature. A further short and long chain PFAS dedicated treatment stage may be present.

Each treatment stage 101, 102 here comprises two vessels respectively 103, 104; 105, 106, which may be mounted in parallel or in series in each stage. Each vessel can be dedicated to nanofiltration, reverse osmosis or reagent contact.

Vessels adapted for reactant contact can be any reaction stirred chamber or settling tanks, in particular sludge recirculating settling tanks optionally pulsed, or any other conventional settling or flotation tank.

Reagents to be used for PFAS removal by contact with water are those previously cited with respect to the method for controlling PFAS removal.

The water treatment facility 1 further includes a control unit 60, in particular for the PFAS treatment unit, but which may also be used to control the other units of the water treatment facility 1. The control unit 60 is adapted to implement the steps of the process of the invention for activating the PFAS treatment unit when appropriate, as well as for controlling its operating conditions once activated, and more specifically to activate the PFAS as long as necessary for PFAS removal. In particular, it can decide that activation is ended when the effluent to treat does not contain any more short and/or long chain PFAS or at a concentration lower than a pre-determined threshold.

The control unit 60 and the PFAS treatment unit 10 form a control system 100 according to the invention.

The control unit 60 may comprise receiving means 61, treatment means 62 and transmitting means 63. Receiving means may be input or input/output interfaces, transmitting means may be output or input/output interfaces. They can be wireless communication interfaces (Bluetooth, WIFI or other) or connectors (network port, USB port, serial port, Firewire® port, SCSI port or other). Treatment means may be one or several processors, for example microprocessors or microcontrollers. The processor(s) may have storage means which may be random access memory (RAM), Electrically-Erasable Programmable Read-Only Memory (EEPROM), flash memory, external memory, or other. These storage devices can store, among other things, received data, a targeted list of PFAS, a control model, a data base and computer program(s).

The water treatment facility 1 here further includes an analysis unit 70 including one apparatus 71 for performing a non targeted analysis and one apparatus 72 for performing a targeted analysis. In the embodiment represented, the water for analysis is taken at the entry of the water treatment facility 1, the invention is however not limited to such position, and the analysis may be performed on water at any stage of the water treatment facility 1.

A pilot unit 80 is also provided for controlling the PFAS treatment unit 10 once activated. Such pilot unit 80 may receive information data from the control unit 60, in particular information data representative of the chemical formula and concentration of PFAS, in particular of targeted PFAS. Such pilot unit 80 may be one or several processors, for example microprocessors or microcontrollers. The processor(s) may have storage means which may be random access memory (RAM), Electrically-Erasable Programmable Read-Only Memory (EEPROM), flash memory, external memory, or other. These storage devices can store, among other things, received data, a targeted list of PFAS, a control model, a data base and computer program(s). The pilot unit 80 may be incorporated into the control unit 60.

FIG. 2 is a flowchart of a first embodiment of the present invention.

STEP 1, there is provided data representative of the presence or absence of PFAS in a liquid effluent to treat. Such information data may result from a non targeted analysis or a targeted analysis.

In the embodiment represented, a non targeted analysis first screens the PFAS present in the liquid effluent and generates information data representative of the chemical formula of screened PFAS, Chem_data. It should be noted that if no PFAS is present, i.e. if no information data representative of the chemical formula of PFAS is generated, an information data representative of the absence of PFAS is generated and the process goes to STEP 7 and stops, no activated signal is generated.

The information data representative of the chemical formula of PFAS are for example a molecular mass range of the PFAS obtained by high resolution mass spectrometry analysis. If this molecular mass is in/outside the range of PFAS molecular mass range, then information data representative of the presence/absence of PFAS is generated. If information data representative of the presence of PFAS is generated, the process goes to STEP 2. In STEP 2, these chemical data are compared with a registered list of targeted PFAS, Reg_List. If targeted PFAS are present in Reg_List, a targeted analysis is performed in STEP 3 on these detected targeted PFAS to obtain inlet concentration of each detected targeted PFAS, [Targ.]_data. If no targeted PFAS are identified, the process goes to STEP 7 and stops, no activated signal is generated.

By way of example, the compounds of the list of Table 1 may be used as a registered list.

TABLE 1

| | Registered list (Reg_List) | | | | |
| --- | --- | --- | --- | --- | --- |
| Class | Compounds | Formule | Carbon number | CAS # | molecular weigth |
| PFCA | TFA = Trifluoroacetic acid | $C_2HF_3O_2$ | C2 | 76-05-1 | 114.02 |
| | PFPrA = pentafluoropropionic acid | $C_3HF_5O_2$ | C3 | 422-64-0 | 164.03 |
| | PFBA = perfluorobutyric acid | $C_4HF_7O_2$ | C4 | 375-22-4 | 214.04 |
| | PFPeA = perfluoropentanoic acid | $C_5HF_9O_2$ | C5 | 2706-90-3 | 264.05 |
| | PFHxA = perfluorohexanoic acid | $C_6HF_{11}O_2$ | C6 | 307-24-4 | 314.05 |
| | PFHpA = perfluoroheptanoic acid | $C_7HF_{13}O_2$ | C7 | 375-85-9 | 364.06 |
| | PFOA = perfluorooctanoic acid | $C_8HF_{15}O_2$ | C8 | 335-67-1 | 414.07 |
| | PFNA = perfluorononanoic acid | $C_9HF_{17}O_2$ | C9 | 375-95-1 | 500.13 |
| | PFDA = perfluorodecanoic acid | $C_{10}HF_{19}O_2$ | C10 | 335-76-2 | 514.08 |
| | PFUnDA = Perfluoroundecanoic acid | $C_{11}HF_{21}O_2$ | C11 | 2058-94-8 | 564.09 |
| | PFDoA = perfluorododecanoic acid | $C_{12}HF_{23}O_2$ | C12 | 307-55-1 | 614.1 |
| | PFTrDA = perfluorotridecanoic acid | $C_{13}HF_{25}O_2$ | C13 | 72629-94-8 | 664.11 |
| | PFTeDA = perfluorotetradecanoic acid | $C_{14}HF_{27}O_2$ | C14 | 376-06-7 | 714.11 |
| | PFHxDA = Perflurohexadecanoic acid | $C_{16}HF_{31}O_2$ | C16 | 67905-19-5 | 814.13 |
| | PFOcDA = perfluorooctadecanoic acid | $C_{18}HF_{35}O_2$ | C18 | 16517-11-6 | 914.14 |
| PFSA | TFMS = Trifluoromethanesulfonic acid | $CF_3SO_3H$ | C1 | 1493-13-6 | 150.08 |
| | PFEtS = Perfluoroethane sulfonic acid | $C_2F_5SO_3H$ | C2 | 354-88-1 | 200.09 |
| | PFPrS = Perfluoropropane sulfonic acid | $C_3F_7SO_3H$ | C3 | 423-41-6 | 250.09 |
| | PFBS = perfluorobutane sulfonic acid | $C_4HF_9O_3S$ | C4 | 375-73-5 | 300.1 |
| | PFPeS = Perfluoropentane sulfonic acid | $C_5HF_{11}O_3S$ | C5 | 2706-91-4 | 350.11 |
| | PFHxS = perfluorohexane sulfonic acid | $C_6HF_{13}O_3S$ | C6 | 355-46-4 | 400.11 |
| | PFHpS = Perfluoroheptane sulfonic acid | $C_7HF_{15}O_3S$ | C7 | 375-92-8 | 450.12 |

TABLE 1-continued

Registered list (Reg_List)

| Class | Compounds | Formule | Carbon number | CAS # | molecular weigth |
|---|---|---|---|---|---|
| | PFOS = perfluorooctane sulfonic acid | $C_8HF_{17}O_3S$ | C8 | 1763-23-1 | 500.13 |
| | PFNS = Perfluorononanesulfonic acid | $C_9HF_{19}O_3S$ | C9 | 68259-12-1 | 550.14 |
| | PFDS = perfluorodecane sulfonate | $C_{10}HF_{21}O_3S$ | C10 | 335-77-3 | 514.08 |
| | PFUnS/PFUnDS = Perfluoroundecane sulfonic acid | $C_{11}F_{23}O_3S$ | C11 | 749786-16-1 | 650.15 |
| | PFDoDS = Perfluorododecanane sulfonic acid | $C_{12}HF_{25}O_3S$ | C12 | 79780-39-5 | 700.16 |
| | PFTriS/PFTrDS = Perfluorotridecane sulfonic acid | $C_{13}F_{27}O_3S$ | C13 | NAN | 749.1 |
| FTS | 4:2 FTS = 4:2 Fluorotelomer sulfonate | $C_6H_5F_9SO_3$ | C6 | 757124-72-4 | 328.15 |
| | 6:2 FTS = 6:2 Fluorotelomer sulfonate | $C_8H_5F_{13}O_3S$ | C8 | 27619-97-2 | 428.17 |
| | 8:2 FTS = 8:2 Fluorotelomer sulfonate | $C_{10}H_5F_{17}SO_3$ | C10 | 39108-34-4 | 528.18 |
| perfluorooctane sulfonic acid derivative | FOSAA = perfluorooctane sulfonamidoacetic acid | $C_{10}H_4F_{17}NO_4S$ | C10 | 2806-24-8 | 557.18 |
| | N-MeFOSAA = N-methyl perfluorooctane sulfonamidoacetic acid | $C_{11}H_6F_{17}NO_4S$ | C11 | 2355-31-9 | 571.21 |
| | N-EtFOSAA = N-ethyl perfluorooctane sulfonamidoacetic acid | $C_{12}H_8F_{17}NO_4S$ | C12 | 2991-50-6 | 585.23 |
| n:2 FTOH | 4:2 FTOH = 4:2 Fluorotelomer alcohol | $C_6H_5F_9O$ | C6 | 2043-47-2 | 264.09 |
| | 6:2 FTOH = 6:2 Fluorotelomer alcohol | $C_8H_5F_{13}O$ | C8 | 647-42-7 | 364.1 |
| | 8:2 FTOH = 8:2 Fluorotelomer alcohol | $C_{10}H_5F_{17}O$ | C10 | 678-39-7 | 464.12 |
| | 10:2 FTOH = 10:2 Fluorotelomer alcohol | $C_{12}H_5F_{21}O$ | C12 | 865-86-1 | 564.13 |
| Di-substituted polyfluorinated phosphate ester | 6:2 diPAP = 6:2 fluorotelomer phosphate diester | $C_{16}H_9F_{26}PO_4$ | C16 | 57677-95-9 | 790.17 |
| | 8:2 diPAP = 8:2 fluorotelomer phosphate diester | $C_{20}H_9F_{34}PO_4$ | C20 | 678-41-1 | 990.2 |
| Perluoroalkane sulfonamido ethanols | FBSE = perdluorobutane sulfonamidoethanol | $C_6H_6F_9NO_3S$ | C6 | 34454-99-4 | 343.17 |
| | N-MeFBSE = N-Methyl-Perfluorobutane sulfonamido ethanol | $C_7H_8F_9NO_3S$ | C7 | 34454-97-2 | 357.19 |
| | N-EtFBSE = N-ethyl-Perfluorobutane sulfonamido ethanol | $C_8H_{10}F_9NO_3S$ | C8 | 34449-89-3 | 371.22 |
| | FOSE = perfluorooctane sulfonamidoethanol | $C_{10}H_6F_{17}NO_3S$ | C10 | 10116-92-4 | 543.19 |
| | MeFOSE = N-methyl perfluorooctane sulfoamido ethanol | $C_{11}H_8F_{17}NO_3S$ | C11 | 24448-09-7 | 557.22 |
| | EtFOSE = N-ethyl perfluorooctane sulfoamido ethanol | $C_{12}H_{10}F_{17}NO_3S$ | C12 | 1691-99-2 | 571.25 |
| FASA | FBSA = perfluorobutane sulfonamide | $C_4H_2F_9NO_2S$ | C4 | 30334-69-1 | 299.12 |
| | N-MeFBSA = N-Methyl perfluorobutane sulfonamide | $C_5H_4F_9NO_2S$ | C5 | 68298-12-4 | 313.14 |
| | N-EtFBSA = N-ethyl-perfluorobutane sulfonamide | $C_6H_6F_9NO_2S$ | C6 | 40630-67-9 | 327.17 |
| | PFOSA = perfluorooctane sulfonamide | $C_8H_2F_{17}NO_2S$ | C8 | 754-91-6 | 499.14 |
| | N-MeFOSA = N-methyl perfluorooctane sulfonamide | $C_9H_4F_{17}NO_2S$ | C9 | 31506-32-8 | 513.17 |
| | N-EtFOSA = N-ethyl perfluorooctane sulfonamide | $C_{10}H_6F_{17}NO_2S$ | C10 | 4151-50-2 | 527.19 |
| Other (PFESAs) | F-53B = Chlorinated polyfluoroalkyl ether sulfonate | $C_8ClF_{16}KO_4S$ | C8 | 73606-19-6 | 570.67 |
| Other PFECA | PFMOAA = Perfluoro-2-methoxyacetic acid | $C_3HF_5O_3$ | C3 | 674-13-5 | 180.03 |
| | PFO2HxA = 3,5-dioxahexanoic acid | $C_4HF_7O_4$ | C4 | 39492-88-1 | 246.04 |
| | PFO3OA = 3,5,7-trioxaoctanoic acid | $C_5HF_9O_5$ | C5 | 39492-89-2 | 312.04 |
| | Gen-X = hexafluoropropylene oxide dimer acid | $C_6HF_{11}O_3$ | C6 | 13252-13-6 | 330.05 |
| | ADONA = dodecafluoro-3H-4,8-dioxanonanoate | $C_7H_5F_{12}NO_4$ | C7 | 958445-44-8 | 395.101 |
| | HFPO-TA = hexafluoropropylene oxide trimer acid | $C_9HF_{17}O_4$ | C9 | 13252-14-7 | 496.07 |

FTS: Fluorinated telomer sulfonate
n:2 FTOH: Fluorotelomer alcohol
FASA: Perfluoroalkane sulfonamide
PFECA: perfluoro-ether carboxylic acids STEP 4, the concentration data of each targeted compound is compared to a threshold, T_Targ. If the concentration data exceed the threshold, the process goes to STEP 5, if no, the process goes to STEP 7 and stops. In STEP 4, alternatively, the concentration data of all detected short chain targeted PFAS may be added, the concentration data of all detected long chain targeted PFAS may be added, and each sum may be compared to a threshold dedicated to short, respectively long, chain PFAS. The threshold(s) is (are) typically imposed by legislation or the user.

STEP 5 generates an activating signal for activating the PFAS unit. Here, as STEP 4 provides information either for particular short or long chain PFAS that exceed minimal content or for two high concentrations of short or long chain PFAS, a signal for activating one of the short chain PFAS dedicated treatment stage, Signal_Short, and/or a signal for activating one of the long chain PFAS dedicated treatment stage, Signal_Long can be generated.

In this STEP 5, the activating signal is configured to activate at least one PFAS dedicated treatment stage which is selected by means of a model using a data basis built from compilation of results of lab-scale and/or pilot-scale tests for each PFAS treatment stage performed on several effluents having different total organic carbon contents and/or minerals contents and/or pH values. By way of example, this data base can comprise information data characteristics of the effluents tested, PFAS analysis of the effluents tested, treatment performances in terms of PFAS removal of each PFAS treatment stage and the associated costs.

The treatment stage to activate is in particular selected depending on the type of PFAS, on the inlet concentration of the FPAS determined in STEP 3, on the removal efficiency to attain and/or on the treatment cost, as previously explained. When several treatments may be selected for removal of different PFAS, then the model may select at least one treatment stage allowing the removal of the most critical PFAS, in particular to attain an outlet concentration on said most critical PFAS compliant with legislation. Further treatment stage(s) may be selected for the removal of other PFAS.

STEP 6, Signal_Short and/or Signal_Long is transmitted to the PFAS unit, more specifically to the appropriate treatment stage, resulting in its activation.

Above STEPS 2, 4, 5, 6, 7 may be performed by the above described control unit 60, in particular by the treatment means 62. STEPS 1 and 3 may be performed by the above described analysis unit 70.

STEP 1 is regularly reiterated whatever the issue of STEP 1. At the beginning of the process, none of the treatment stages are activated. When one or several treatment stages have been activated following the receipt of an activation signal (STEP 6), they remain activated until the receipt of a deactivation signal. Such deactivation signal may be generated in STEP 7 if, in a previous iteration, an activation signal has been transmitted in STEP 6. STEP 7 then also transmits the deactivation signal to the PFAS unit, resulting in its deactivation.

In a second embodiment, in STEP 1, the information data may be obtained by another non targeted analysis giving global fluorine information such as combustion ion chromatography, particle-induced gamma ray emission spectroscopy, and/or fluorine nucleic magnetic resonance. In this case, information data representative of the presence of carbon-fluorine bonds or of the presence of fluorine are obtained. These information data are typically a PFAS specific signal intensity, a PFAS specific signal surface, a sum of the intensities of a group of PFAS specific signals, a sum of the surfaces of a group of PFAS specific signals, a sum of the intensities of all PFAS specific signals.

These information data are considered as data representative of the presence of PFAS when they are above a predetermined threshold. This threshold depends on the sensibility of the analysis and can be determined from previously performed analysis on effluents having different known concentrations of PFAS.

The information data are then representative of the presence/absence of PFAS when the information data registered during the analysis is above/below this predetermined threshold. If absence is detected, the process goes to STEP 7. If presence of PFAS is detected, the process goes directly to STEP 3, where a targeted analysis is performed on each of the PFAS of a registered list (for example the list of table 1). STEPS 4 to 7 are then performed as described above and STEP 1 is regularly reiterated.

In a third embodiment, STEP 2 may also be omitted. STEP 1 then provides data representative of the presence or absence of PFAS from a non targeted analysis. These data are for example the global intensity of a graph obtained by a non-targeted analysis typically high resolution mass spectroscopy. More specifically, this global intensity is a global intensity of signals specific to PFAS, obtained for example by extracting the data as a function of mass fragments to retain only those coming from PFAS compounds.

Then, always in STEP 1, data corresponding to an estimated total concentration of PFAS is estimated from the global intensity provided, using a previously built data base which correlates global intensities of PFAS with a total concentration of targeted PFAS.

STEP 1 then determines the absence of PFAS when this estimated total concentration of PFAS is below a predetermined threshold, typically imposed by legislation or a user, for example 100 ng/L. When presence of PFAS is detected, then the process goes to STEP 3 as disclosed above. If absence of PFAS is detected (estimated total concentration of PFAS above the predetermined threshold), the process goes to STEP 7.

The data base used in this STEP 1 may be built as described hereafter.

First, a non-targeted analysis (mass spectroscopy) is done on an effluent (corresponding to the liquid effluent to treat, more or less charged in dissolved organics and minerals) i.e. on several effluents having different total organic carbon contents and/or minerals contents and/or pH values. The global intensity of the graph obtained by this non-targeted analysis is then registered for each effluent analyzed.

Then, a targeted analysis is performed on the same effluents for a registered list of PFAS targeted compounds (for example the 60 compounds of table 1 above) allowing the determination of the concentration of each of these targeted compounds.

The non-targeted analysis and targeted analysis results are then statistically analyzed so as to correlate a global intensity of the graph obtained by the non-targeted analysis with the total concentration of the targeted compounds.

The data base also includes the predetermined threshold level for PFAS presence, corresponding for example to a total concentration of PFAS of at least 100 ng/L.

This data base may also include a classification of the PFAS compounds and a specific PFAS treatment stage associated to each class of PFAS compounds. This classification of the PFAS can include the three main following classes:

class 1: short chain PFAS
class 2: long chain polar PFAS,
class 3: long chain apolar PFAS.

in STEP 5, the activating signal generated is for activating a least one treatment stage selected by a model using the above data base further including information characteristics of the effluents tested, PFAS analysis of the effluents tested, treatment performances in terms of PFAS removal of each PFAS treatment stage and the associated costs.

This selection can be performed as explained with respect to the first embodiment depending on the type of PFAS, on the initial concentration of the FPAS determined in STEP 3, on the removal efficiency to attain and/or on the treatment cost.

When no critical PFAS is to be remove, the selection may include the determination of the analytic class to which fluorine aryl cross-linker to cross-link β-CD. It has been used in powder form or granular form at a dose of 10 to 20 mg/L.

The properties of P-CDP polymer are gathered in table 2:

TABLE 2

| Surface Area | Standard NF EN ISO 18757-June 2006 | Up to 450 m²/g |
|---|---|---|
| Averaged Apparent Density | ASTM D2854-09 (2019). Standard Test Method for Apparent Density of Activated Carbon. | 0.56 g/cc |
| Effective size (powder) | Standard NF EN ISO 8130-1 (2019 May 8) | Averaged 78 μm |
| Effective size (granules) | Standards NF EN 12915-1-July 2009 and NF EN 12902-February 2005 | 212-500 μm; 500-1500 μm | belongs the PFAS for which a targeted analysis has been performed and the selection of at least one treatment allowing to attain a specific removal efficiency for this class of PFAS and for the inlet concentrations of this class of PFAS determined in STEP3.

When one or more critical PFAS are to be removed, the selection may include:

selection of the treatment stage having the higher removal efficiency towards the most critical PFAS for the inlet concentration of said critical PFAS determined in STEP3, if necessary to achieve a specific removal efficiency of other critical PFAS, selection of at least one other treatment stage for the inlet concentration of said other critical PFAS determined in STEP3.

Batch experiments were performed on tumblers with a series of representative adsorbent doses. Water samples were collected and analyzed at time points of 5 minutes, 10 minutes and 70 minutes. All batch reactors were tumbled for 15 minutes and then stopped for the remaining 55 minutes to let the adsorbents settle until the 70-min samples were collected. This is to simulate the mixing pattern at Rahway Facility. The water samples were analyzed standard methods on HPLC-MS/MS (Thermofisher, QExactive). For each adsorbent dose and time point, triplicate was performed to quantify error and guarantee the reliability of each data point. The removal of each PFAS at 70 minutes is presented in Table 3. These results show efficiency of the P-CDP polymer to remove short chain PFAS.

TABLE 3

| PFAS | C # | CAS # | Background concentration mass ppt | m % removal | | | | |
|---|---|---|---|---|---|---|---|---|
| | | | | 5 mg/L | 10 mg/L | 20 mg/L | 30 mg/L | 50 mg/L |
| PFPeA | C5 | 2706-90-3 | 5.6 | 1.6 | 6.9 | 12.5 | 18.2 | 30.6 |
| PFBS | C4 | 375-73-5 | 4.0 | 49.7 | 71.1 | 100.0 | 100.0 | 100.0 |
| PFHxA | C6 | 307-24-4 | 7.0 | 10.7 | 24.4 | 37.4 | 52.5 | 69.5 |
| PFHpA | C7 | 375-85-9 | 6.2 | 24.6 | 41.6 | 61.9 | 75.1 | 86.2 |
| PFHxS | C6 | 355-46-4 432-50-8 | 6.3 | 67.7 | 83.2 | 89.5 | 94.1 | 100.0 |
| PFOA | C8 | 335-67-1 | 32.9 | 30.0 | 53.7 | 76.5 | 87.6 | 94.9 |
| PFOS | C8 | 1763-23-1 | 7.9 | 76.5 | 100.0 | 100.0 | 100.0 | 100.0 |
| PFNA | C9 | 375-95-1 | 1.8 | 33.0 | 100.0 | 100.0 | 100.0 | 100.0 |

Thus, this may result in the combination of two reagents in a same vessel, or to the combination of two or more treatments in series (a first vessel with a first reagent followed by a second vessel with a second reagent, or a first vessel with a first reagent followed by a membrane filtration, . . . ) and/or in parallel.

In a fourth embodiment, STEPS 1 and 2 may be omitted. In such a case, If the concentration data exceed the threshold previously mentioned for STEP4, data representative of the presence of PFAS are generated and the process goes to STEP 5, if not, data representative of the absence of PFAS are generated, the process goes to STEP 7 and stops. STEPs 5 and 6 may be performed as previously described.

In the third and fourth embodiments, STEPS 4 to 7 are performed as described with respect to the first embodiment and STEP 1 is regularly reiterated.

EXAMPLES

Figure 3:
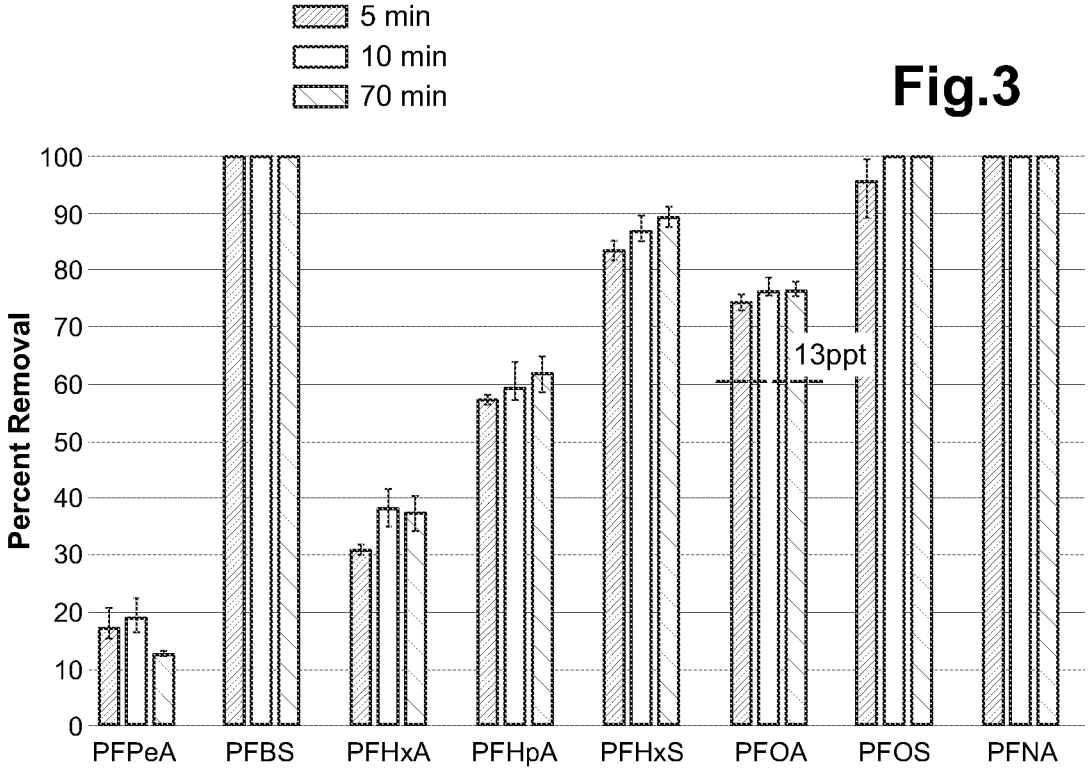
FIGS. 3 and 4 show adsorbent uptake of different PFAS for different doses of adsorbent and at different contact times.
Figure 4:
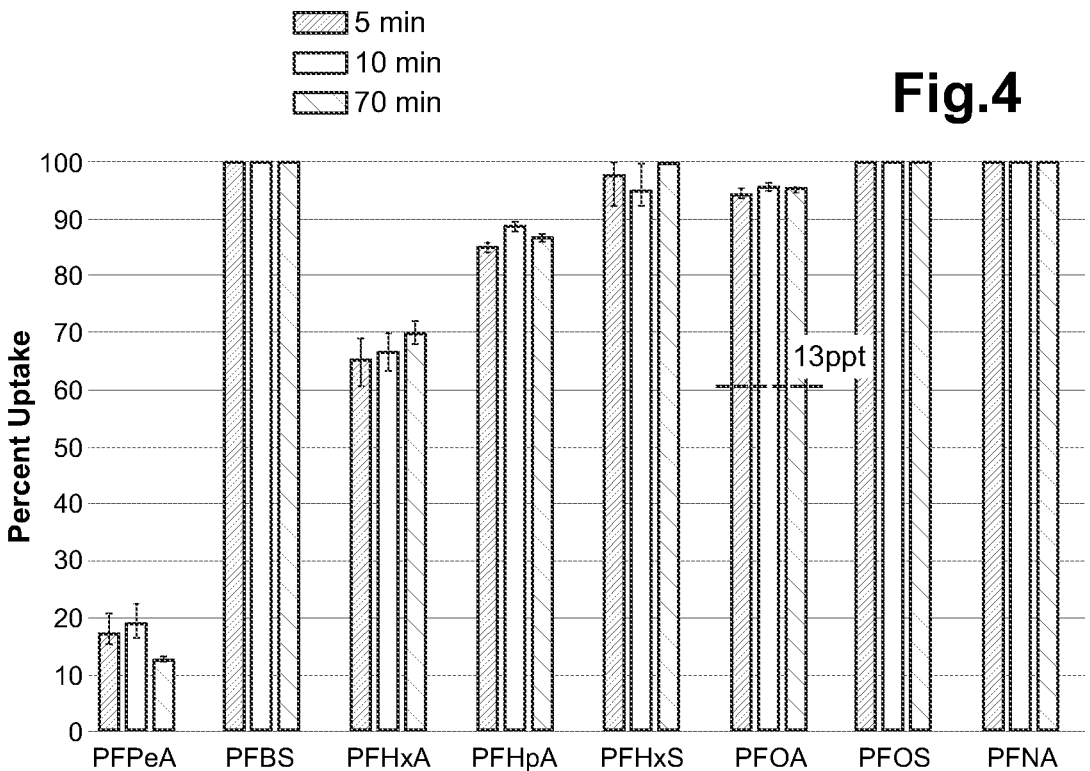

A P-CDP polymer has been tested for PFAS removal in a settling tank. The P-CDP polymer is obtained by using a Similar results have been observed at 10 and 70 minutes demonstrating the rapid removal kinetic of the absorbent, as can also be seen on FIGS. 3 and 4 which show the mass percent uptake of the adsorbent for each PFAS at 5, 10 and 70 min (from left to right for each PFAS), for two doses 20 mg/L (FIG. 3) and 50 mg/L (FIG. 4). Bars on the figures represent the measurement error and minimum and maximum uptake.

The invention claimed is:

1. A controlled liquid effluent system for removing PFAS substances from the liquid effluent comprising:

an analysis unit including at least one apparatus configured to perform a non targeted analysis of the liquid effluent to treat, and generate information for providing the following data: data representative of the presence of carbon-fluorine bonds, data representative of the presence of fluorine, data representative of the chemical formula of at least one PFAS present in the liquid effluent to treat, and data representative of an estimated total concentration of targeted PFAS, optionally at least one apparatus configured to perform a targeted analysis of the liquid effluent to treat and generate information data representative of the concentration of PFAS identified in the liquid effluent, a PFAS treatment unit dedicated to removal of perfluoroalkyls and polyfluoroalkyl substances PFAS, said PFAS treatment unit including at least one treatment stage chosen from a short chain PFAS and long chain PFAS dedicated treatment stage, a short chain PFAS dedicated treatment stage and a long chain PFAS dedicated treatment stage, where:

the long chain PFAS refer to perfluoroalkyl carboxylic acids with eight or more carbons, to perfluoroalkane sulfonates with six or more carbons, and to all the other perfluoroalkyls and polyfluoroalkyl substances PFAS having a carbon chain with six or more carbon atoms, the short chain PFAS refer to perfluoroalkyl carboxylic acids with seven or fewer carbons, to perfluoroalkane sulfonates with five or fewer carbons, and to all the other perfluoroalkyls and polyfluoroalkyl substances PFAS having a carbon chain with five or less carbon atoms, and a control unit configured to:

provide information data representative of the presence or absence of PFAS in liquid effluent to treat, generate at least one activating signal for activating the PFAS treatment unit when the provided information data indicate the presence of PFAS chosen from short chain PFAS, long chain PFAS and short and long chain PFAS, this signal being chosen from:

a signal for activating said at least one short and long chain PFAS dedicated treatment stage when the provided information data include information data representative of the presence of at least one PFAS chosen from short chain PFAS, long chain PFAS and short and long chain PFAS, a signal for activating said at least one short chain PFAS dedicated treatment stage when the provided information data include information data representative of the presence of at least one short chain PFAS, and a signal for activating at least one long chain PFAS dedicated treatment stage when the provided information data include information data representative of the presence of at least one long chain PFAS, and transmit said at least one activating signal to the PFAS treatment unit to activate the PFAS treatment unit, and to remove at least a part of the PFAS from the liquid effluent.

2. The controlled liquid effluent system as claimed in claim 1, wherein the control unit is configured to provide information data by:

determining information data of the raw water chosen among one or several of the following data: data representative of the presence of carbon-fluorine bonds, data representative of the presence of fluorine, data representative of the chemical formula of at least one PFAS, data representative of the concentration of at least one PFAS, data representative of the absence of PFAS and data representative of an estimated total concentration of targeted PFAS.

3. The controlled liquid effluent system as claimed in claim 1, wherein the control unit is configured to provide information data by:

(i) determining at least one information data representative of a chemical formula of at least one PFAS present in the liquid effluent, and (ii) providing information data representative of the presence of PFAS, comprising:

identifying targeted PFAS present in the liquid effluent by comparing the received at least one information data representative of the chemical formula with a registered list of targeted PFAS, this list including chemical formulas of targeted short chain PFAS, targeted long chain PFAS, or both, optionally providing concentration data representative of the concentration in the liquid effluent of the identified targeted PFAS, and providing information data representative of the presence of the identified targeted PFAS, and optionally of their concentration.

4. The controlled liquid effluent system as claimed in claim 1, further comprising a pilot unit configured to control operating conditions of the PFAS treatment unit as a function of one or several parameters chosen among identified PFAS, PFAS concentration, and efficiency of the removal contained in the liquid effluent to treat.

5. The controlled liquid effluent system as claimed in claim 1, wherein the PFAS treatment unit comprises at least one of the following features:

at least one vessel to implement said at least one treatment stage, at least two vessels in series and/or in parallel, at least one of the two vessels dedicated to at least one treatment stage, optionally a short chain PFA dedicated treatment stage, and at least the other of the two vessels dedicated to at least one other treatment stage, optionally a long chain PFA dedicated treatment stage.

6. The controlled liquid effluent system as claimed in claim 1, wherein the PFAS treatment unit comprises at least one reagent dedicated to remove the PFAS by ionic exchange, adsorption or both, said one reagent being chosen among a reagent dedicated to remove long chain PFAS, a reagent dedicated to remove short chain PFAS and a reagent dedicated to remove short and long chain PFAS, said at least one reagent being in granular or powder form.

7. The controlled liquid effluent system as claimed in claim 6, wherein the at least one reagent dedicated to remove PFAS is chosen from:

a cyclodextrin polymer supported or not on a solid substrate, activated carbon, organoclays, inorganic-organic clays, anion exchange resins, and biochar or activated biochar.

8. A method for controlling removal of perfluoroalkyl and polyfluoroalkyl substances PFAS from a liquid effluent by means of a PFAS treatment unit controlled by means of a control system, the PFAS treatment unit dedicated to the treatment of PFAS including at least one treatment stage chosen from a short and long chain PFAS dedicated treatment stage, a short chain PFAS dedicated treatment stage and a long chain PFAS dedicated treatment stage, where the long chain PFAS refer to perfluoroalkyl carboxylic acids with eight or more carbons, to perfluoroalkane sulfonates with six or more carbons, and to all the other perfluoroalkyls and polyfluoroalkyl substances PFAS having a carbon chain with six or more carbon atoms, the short chain PFAS refer to perfluoroalkyl carboxylic acids with seven or fewer carbons, to perfluoroalkane sulfonates with five or fewer carbons, and to all the other perfluoroalkyls and polyfluoroalkyl substances PFAS having a carbon chain with five or less carbon atoms, the method comprising:

(A) providing information data representative of the presence or absence of PFAS in a liquid effluent to treat, wherein the step (A) includes:

performing on the liquid effluent to treat a non targeted analysis and generating information data for providing the following data: data representative of the presence of carbon-fluorine bonds, data representative of the presence of fluorine, data representative of the chemical formula of at least one PFAS present in the liquid effluent to treat, and data representative of an estimated total concentration of targeted PFAS, optionally:

identifying targeted PFAS present in the liquid effluent by comparing the information data generated by the non targeted analysis with a registered list of targeted PFAS, this list including the chemical formulas of targeted short chain PFAS, targeted long chain PFAS, or both, performing on the liquid effluent to treat a targeted analysis and generating information data representative of the concentration of targeted PFAS identified in the liquid effluent, (B) generating at least one activating signal for activating the PFAS treatment unit when the provided information data indicate the presence of PFAS chosen from short chain PFAS, long chain PFAS, and short and long chain PFAS, said at least one activating signal being the signal chosen from:

a signal for activating said at least one short and long chain PFAS dedicated treatment stage when the provided information data includes information data representative of the presence of at least one PFAS chosen from short chain PFAS, long chain PFAS and short and long chain PFAS, a signal for activating said at least one short chain PFAS dedicated treatment stage when the provided information data include information data representative of the presence of at least one short chain PFAS, and a signal for activating said at least one long chain PFAS dedicated treatment stage when the provided information data include information data representative of the presence of at least one long chain PFAS, and (C) transmitting said at least one activating signal to the PFAS treatment unit to activate said at least one treatment stage of the PFAS treatment unit, and to remove at least a part of the PFAS from the liquid effluent.

9. The method as claimed in claim 8, wherein the step (A) for providing information data includes:

determining information data of the liquid effluent chosen among one or several of the following data: data representative of the presence of carbon-fluorine bonds, data representative of the presence of fluorine, data representative of the chemical formula of at least one PFAS, data representative of the concentration of at least one PFAS, data representative of the absence of PFAS and data representative of an estimated total concentration of targeted PFAS.

10. The method as claimed in claim 8, wherein, the step (A) for providing information data includes:

(i) determining at least one information data representative of a chemical formula of at least one PFAS present in the liquid effluent, (ii) a step of providing information data representative of the presence of PFAS comprising:

identifying targeted PFAS present in the liquid effluent by comparing the received at least one information data representative of the chemical formula with a registered list of targeted PFAS, this list including chemical formulas of targeted short chain PFAS, targeted long chain PFAS, or both, optionally providing concentration data representative of the concentration in the liquid effluent of the identified targeted PFAS, and providing information data representative of the presence of identified targeted PFAS, and optionally of their concentration.

11. The method as claimed in claim 8, wherein the step (A) for providing information data includes:

determining information data of the liquid effluent including data representative of the concentration of at least one PFAS chosen from a short chain PFAS and a long chain PFA, and the step (B) includes:

generating said at least one signal for activating said at least one short chain PFAS dedicated treatment stage when data representative of the concentration of one or several short chain PFAS are above a first threshold, specific for short chain PFAS, generating said at least one signal for activating said at least one long chain PFAS dedicated treatment stage when data representative of the concentration of one or several long chain PFAS are above a second threshold, specific for long chain PFAS, and optionally generating at least one signal for activating said at least one short and long chain PFAS dedicated treatment stage.

12. The method as claimed in claim 8, wherein, once activated, operating conditions of the PFAS treatment unit are controlled as a function of one or several parameters chosen among identified PFAS, PFAS concentration, and efficiency of the removal contained in the liquid effluent to treat.

13. The method as claimed in claim 8, wherein, during activation of the PFAS treatment unit, the liquid effluent is submitted to at least one of the following treatments:

a treatment in which the liquid effluent is contacted with at least one reagent dedicated to remove the PFAS by ionic exchange, adsorption or both, said at least one reagent being chosen among a reagent dedicated to remove long chain PFAS, a reagent dedicated to remove short chain PFAS and a reagent dedicated to remove short and long chain PFAS, said at least one reagent being in granular or powder form, a nanofiltration, and a reverse osmosis.

14. The method as claimed in claim 13, wherein said at least one reagent dedicated to remove PFAS is chosen from:

-a cyclodextrin polymer supported or not on a solid substrate, activated carbon, organoclays, inorganic-organic clays, anion exchange resins, and biochar or activated biochar.

15. The controlled liquid effluent system as claimed in claim 1, wherein the corresponding at least one PFAS treatment stage is chosen from a short and long chain PFAS dedicated treatment stage, a short chain PFAS dedicated treatment stage and a long chain PFAS dedicated treatment stage.

16. The method as claimed in claim 8, wherein the corresponding at least one PFAS treatment stage is chosen from a short and long chain PFAS dedicated treatment stage, a short chain PFAS dedicated treatment stage and a long chain PFAS dedicated treatment stage.

\* \* \* \* \*